(12) United States Patent
McNutt

(10) Patent No.: US 11,816,237 B2
(45) Date of Patent: *Nov. 14, 2023

(54) METHODS AND SYSTEMS FOR ENCRYPTING DATA USING OBJECT-BASED SCREENS

(71) Applicant: CERULEANT SYSTEMS, LLC, Crystal, MN (US)

(72) Inventor: Jason McNutt, Crystal, MN (US)

(73) Assignee: CERULEANT SYSTEMS, LLC, Crystal, MN (US)

( * ) Notice: Subject to any disclaimer, the term of this patent is extended or adjusted under 35 U.S.C. 154(b) by 337 days.

This patent is subject to a terminal disclaimer.

(21) Appl. No.: 17/156,775

(22) Filed: Jan. 25, 2021

(65) Prior Publication Data
US 2021/0248257 A1 Aug. 12, 2021

Related U.S. Application Data

(63) Continuation of application No. 16/153,917, filed on Oct. 8, 2018, now Pat. No. 10,902,142, which is a continuation-in-part of application No. 15/728,058, filed on Oct. 9, 2017, now Pat. No. 10,121,022.

(51) Int. Cl.
| | |
|---|---|
| G06F 21/62 | (2013.01) |
| G06F 9/30 | (2018.01) |
| G06F 21/32 | (2013.01) |
| G06F 21/60 | (2013.01) |
| H04L 9/08 | (2006.01) |
| H04L 9/32 | (2006.01) |

(52) U.S. Cl.
CPC ...... *G06F 21/6218* (2013.01); *G06F 9/30029* (2013.01); *G06F 21/32* (2013.01); *G06F 21/602* (2013.01); *H04L 9/0866* (2013.01); *H04L 9/0872* (2013.01); *H04L 9/3247* (2013.01); *H04L 9/3297* (2013.01)

(58) Field of Classification Search
None
See application file for complete search history.

(56) References Cited

U.S. PATENT DOCUMENTS

2017/0353302 A1* 12/2017 Fernandez ............ H04L 1/0075
2021/0211271 A1* 7/2021 Kuang ................. H04L 9/3239

FOREIGN PATENT DOCUMENTS

CN 106788974 A * 5/2017 .......... G06F 21/602

* cited by examiner

*Primary Examiner* — Arezoo Sherkat
(74) *Attorney, Agent, or Firm* — Stinson LLP

(57) ABSTRACT

A system and method is provided for encrypting data for secure storage or transport. The method includes generating object-based wave screen(s) and optionally stumbling block(s) and/or XOR block(s) associated with a block map layout. For each data segment to be encrypted, the method includes positioning the bits of the data segment within the block map layout to generate a data map, and encrypting the data map by applying the object-based wave screen(s) and optionally the stumbling block(s) and/or XOR block(s) to remap the positions of the bits within the block map layout. The encrypted data map is then stored or transported as a representation of the data segment.

32 Claims, 40 Drawing Sheets

|   | A | B | C | D | E | F | G | H | I | J | K | L | M | N | O | P |
|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 |
| 2 | 17 | 18 | 19 | 20 | 21 | 22 | 23 | 24 | 25 | 26 | 27 | 28 | 29 | 30 | 31 | 32 |
| 3 | 33 | 34 | 35 | 36 | 37 | 38 | 39 | 40 | 41 | 42 | 43 | 44 | 45 | 46 | 47 | 48 |
| 4 | 49 | 50 | 51 | 52 | 53 | 54 | 55 | 56 | 57 | 58 | 59 | 60 | 61 | 62 | 63 | 64 |
| 5 | 65 | 66 | 67 | 68 | 69 | 70 | 71 | 72 | 73 | 74 | 75 | 76 | 77 | 78 | 79 | 80 |
| 6 | 81 | 82 | 83 | 84 | 85 | 86 | 87 | 88 | 89 | 90 | 91 | 92 | 93 | 94 | 95 | 96 |
| 7 | 97 | 98 | 99 | 100 | 101 | 102 | 103 | 104 | 105 | 106 | 107 | 108 | 109 | 110 | 111 | 112 |
| 8 | 113 | 114 | 115 | 116 | 117 | 118 | 119 | 120 | 121 | 122 | 123 | 124 | 125 | 126 | 127 | 128 |
| 9 | 129 | 130 | 131 | 132 | 133 | 134 | 135 | 136 | 137 | 138 | 139 | 140 | 141 | 142 | 143 | 144 |
| 10 | 145 | 146 | 147 | 148 | 149 | 150 | 151 | 152 | 153 | 154 | 155 | 156 | 157 | 158 | 159 | 160 |
| 11 | 161 | 162 | 163 | 164 | 165 | 166 | 167 | 168 | 169 | 170 | 171 | 172 | 173 | 174 | 175 | 176 |
| 12 | 177 | 178 | 179 | 180 | 181 | 182 | 183 | 184 | 185 | 186 | 187 | 188 | 189 | 190 | 191 | 192 |
| 13 | 193 | 194 | 195 | 196 | 197 | 198 | 199 | 200 | 201 | 202 | 203 | 204 | 205 | 206 | 207 | 208 |
| 14 | 209 | 210 | 211 | 212 | 213 | 214 | 215 | 216 | 217 | 218 | 219 | 220 | 221 | 222 | 223 | 224 |
| 15 | 225 | 226 | 227 | 228 | 229 | 230 | 231 | 232 | 233 | 234 | 235 | 236 | 237 | 238 | 239 | 240 |
| 16 | 241 | 242 | 243 | 244 | 245 | 246 | 247 | 248 | 249 | 250 | 251 | 252 | 253 | 254 | 255 | 256 |

| 1 | 2 | 3 | 4 | 5 | 6 | 7 | 8 |
|---|---|---|---|---|---|---|---|
| 0 | 1 | 0 | 1 | 0 | 0 | 0 | 1 |

| 9 | 10 | 11 | 12 | 13 | 14 | 15 | 16 |
|---|---|---|---|---|---|---|---|
| 1 | 0 | 1 | 0 | 1 | 0 | 0 | 0 |

| 17 | 18 | 19 | 20 | 21 | 22 | 23 | 24 |
|---|---|---|---|---|---|---|---|
| 1 | 0 | 1 | 0 | 1 | 0 | 0 | 1 |

| 25 | 26 | 27 | 28 | 29 | 30 | 31 | 32 |
|---|---|---|---|---|---|---|---|
| 0 | 1 | 1 | 0 | 1 | 1 | 1 | 1 |

| 33 | 34 | 35 | 36 | 37 | 38 | 39 | 40 |
|---|---|---|---|---|---|---|---|
| 0 | 1 | 0 | 0 | 1 | 0 | 1 | 1 |

| 41 | 42 | 43 | 44 | 45 | 46 | 47 | 48 |
|---|---|---|---|---|---|---|---|
| 0 | 0 | 1 | 1 | 0 | 0 | 1 | 0 |

| 49 | 50 | 51 | 52 | 53 | 54 | 55 | 56 |
|---|---|---|---|---|---|---|---|
| 1 | 0 | 0 | 0 | 1 | 1 | 0 | 1 |

| 57 | 58 | 59 | 60 | 61 | 62 | 63 | 64 |
|---|---|---|---|---|---|---|---|
| 1 | 0 | 0 | 1 | 1 | 0 | 1 | 0 |

| | A | B | C | D | E | F | G | H | I | J | K | L | M | N | O | P |
|---|---|---|---|---|---|---|---|---|---|---|---|---|---|---|---|---|
| 1 | 0 | 1 | 0 | 1 | 0 | 0 | 0 | 1 | 1 | 0 | 1 | 0 | 1 | 0 | 0 | 0 |
| 2 | 1 | 0 | 1 | 0 | 1 | 0 | 0 | 1 | 0 | 1 | 1 | 0 | 1 | 1 | 1 | 1 |
| 3 | 0 | 1 | 0 | 0 | 1 | 0 | 1 | 1 | 0 | 0 | 1 | 1 | 0 | 0 | 1 | 0 |
| 4 | 1 | 0 | 0 | 0 | 1 | 1 | 0 | 1 | 1 | 0 | 0 | 1 | 1 | 0 | 1 | 0 |
| 5 | 0 | 1 | 0 | 1 | 0 | 0 | 0 | 1 | 1 | 0 | 1 | 0 | 1 | 0 | 0 | 0 |
| 6 | 1 | 0 | 1 | 0 | 1 | 0 | 0 | 1 | 0 | 1 | 1 | 0 | 1 | 1 | 1 | 1 |
| 7 | 0 | 1 | 0 | 0 | 1 | 0 | 1 | 1 | 0 | 0 | 1 | 1 | 0 | 0 | 1 | 0 |
| 8 | 1 | 0 | 0 | 0 | 1 | 1 | 0 | 1 | 1 | 0 | 0 | 1 | 1 | 0 | 1 | 0 |
| 9 | 0 | 1 | 0 | 1 | 0 | 0 | 0 | 1 | 1 | 0 | 1 | 0 | 1 | 0 | 0 | 0 |
| 10 | 1 | 0 | 1 | 0 | 1 | 0 | 0 | 1 | 0 | 1 | 1 | 0 | 1 | 1 | 1 | 1 |
| 11 | 0 | 1 | 0 | 0 | 1 | 0 | 1 | 1 | 0 | 0 | 1 | 1 | 0 | 0 | 1 | 0 |
| 12 | 1 | 0 | 0 | 0 | 1 | 1 | 0 | 1 | 1 | 0 | 0 | 1 | 1 | 0 | 1 | 0 |
| 13 | 0 | 1 | 0 | 1 | 0 | 0 | 0 | 1 | 1 | 0 | 1 | 0 | 1 | 0 | 0 | 0 |
| 14 | 1 | 0 | 1 | 0 | 1 | 0 | 0 | 1 | 0 | 1 | 1 | 0 | 1 | 1 | 1 | 1 |
| 15 | 0 | 1 | 0 | 0 | 1 | 0 | 1 | 1 | 0 | 0 | 1 | 1 | 0 | 0 | 1 | 0 |
| 16 | 1 | 0 | 0 | 0 | 1 | 1 | 0 | 1 | 1 | 0 | 0 | 1 | 1 | 0 | 1 | 0 |

FIG. 3

| | | | | | | | | | | | | | | | | | | |
|---|---|---|---|---|---|---|---|---|---|---|---|---|---|---|---|---|---|---|
| 1 | 1 | 0 | Rt | 2 | 9 | 17 | 1 | Lt | 2 | 17 | 33 | 0 | Rt | 2 | 25 | 49 | 1 | Lt | 2 |
|   | 2 | 1 | Dn | 5 |   | 18 | 0 | Up | 5 |    | 34 | 1 | Dn | 5 |    | 50 | 0 | Up | 5 |
| 2 | 3 | 0 | Rt | 1 | 10 | 19 | 1 | Lt | 1 | 18 | 35 | 0 | Rt | 1 | 26 | 51 | 0 | Rt | 1 |
|   | 4 | 1 | Dn | 7 |   | 20 | 0 | Up | 7 |    | 36 | 0 | Up | 7 |    | 52 | 0 | Up | 7 |
| 3 | 5 | 0 | Rt | 3 | 11 | 21 | 1 | Lt | 3 | 19 | 37 | 1 | Lt | 3 | 27 | 53 | 1 | Lt | 3 |
|   | 6 | 0 | Up | 4 |   | 22 | 0 | Up | 4 |    | 38 | 0 | Up | 4 |    | 54 | 1 | Dn | 4 |
| 4 | 7 | 0 | Rt | 8 | 12 | 23 | 0 | Rt | 8 | 20 | 39 | 1 | Lt | 8 | 28 | 55 | 0 | Rt | 8 |
|   | 8 | 1 | Dn | 6 |   | 24 | 1 | Dn | 6 |    | 40 | 1 | Dn | 6 |    | 56 | 1 | Dn | 6 |
| 5 | 9 | 1 | Lt | 2 | 13 | 25 | 0 | Rt | 2 | 21 | 41 | 0 | Rt | 2 | 29 | 57 | 1 | Lt | 2 |
|   | 10 | 0 | Up | 5 |   | 26 | 1 | Dn | 5 |    | 42 | 0 | Up | 5 |    | 58 | 0 | Up | 5 |
| 6 | 11 | 1 | Lt | 1 | 14 | 27 | 1 | Lt | 1 | 22 | 43 | 1 | Lt | 1 | 30 | 59 | 0 | Rt | 1 |
|   | 12 | 0 | Up | 7 |   | 28 | 0 | Up | 7 |    | 44 | 1 | Dn | 7 |    | 60 | 1 | Dn | 7 |
| 7 | 13 | 1 | Lt | 3 | 15 | 29 | 1 | Lt | 3 | 23 | 45 | 0 | Rt | 3 | 31 | 61 | 1 | Lt | 3 |
|   | 14 | 0 | Up | 4 |   | 30 | 1 | Dn | 4 |    | 46 | 0 | Up | 4 |    | 62 | 0 | Up | 4 |
| 8 | 15 | 0 | Rt | 8 | 16 | 31 | 1 | Lt | 8 | 24 | 47 | 1 | Lt | 8 | 32 | 63 | 1 | Lt | 8 |
|   | 16 | 0 | Up | 6 |   | 32 | 1 | Dn | 6 |    | 48 | 0 | Up | 6 |    | 64 | 0 | Up | 6 |

| 1 | From | - | To | | 2 | From | - | To | | 3 | From | - | To | | 4 | From | - | To | |
|---|---|---|---|---|---|---|---|---|---|---|---|---|---|---|---|---|---|---|---|
| 1 | A | 1 | D | 6 | 17 | A | 2 | C | 7 | 33 | A | 3 | F | 8 | 49 | A | 4 | C | 9 |
| 2 | B | 1 | C | 8 | 18 | B | 2 | C | 11 | 34 | B | 3 | D | 10 | 50 | B | 4 | C | 13 |
| 3 | C | 1 | F | 13 | 19 | C | 2 | A | 15 | 35 | C | 3 | F | 15 | 51 | C | 4 | P | 16 |
| 4 | D | 1 | M | 7 | 20 | D | 2 | M | 8 | 36 | D | 3 | L | 9 | 52 | D | 4 | L | 10 |
| 5 | E | 1 | C | 12 | 21 | E | 2 | G | 13 | 37 | E | 3 | D | 14 | 53 | E | 4 | H | 15 |
| 6 | F | 1 | F | 10 | 22 | F | 2 | E | 9 | 38 | F | 3 | F | 12 | 54 | F | 4 | F | 11 |
| 7 | G | 1 | E | 13 | 23 | G | 2 | K | 14 | 39 | G | 3 | D | 15 | 55 | G | 4 | J | 16 |
| 8 | H | 1 | P | 11 | 24 | H | 2 | P | 12 | 40 | H | 3 | P | 13 | 56 | H | 4 | P | 14 |
| 9 | I | 1 | G | 12 | 25 | I | 2 | H | 13 | 41 | I | 3 | G | 14 | 57 | I | 4 | G | 15 |
| 10 | J | 1 | I | 10 | 26 | J | 2 | L | 11 | 42 | J | 3 | J | 12 | 58 | J | 4 | K | 13 |
| 11 | K | 1 | I | 13 | 27 | K | 2 | I | 6 | 43 | K | 3 | I | 15 | 59 | K | 4 | I | 8 |
| 12 | L | 1 | D | 7 | 28 | L | 2 | D | 8 | 44 | L | 3 | F | 9 | 60 | L | 4 | E | 10 |
| 13 | M | 1 | P | 6 | 29 | M | 2 | L | 13 | 45 | M | 3 | P | 8 | 61 | M | 4 | L | 15 |
| 14 | N | 1 | N | 10 | 30 | N | 2 | O | 9 | 46 | N | 3 | N | 12 | 62 | N | 4 | A | 12 |
| 15 | O | 1 | L | 5 | 31 | O | 2 | L | 14 | 47 | O | 3 | L | 7 | 63 | O | 4 | M | 16 |
| 16 | P | 1 | I | 7 | 32 | P | 2 | I | 12 | 48 | P | 3 | I | 9 | 64 | P | 4 | I | 14 |

FIG. 6A

| 5 | From | | To | | 6 | From | | To | | 7 | From | | To | | 8 | From | | To | |
|---|---|---|---|---|---|---|---|---|---|---|---|---|---|---|---|---|---|---|
| 65 | A | 5 | - | C 10 | 81 | A | 6 | - | E 11 | 97 | A | 7 | - | H 12 | 113 | A | 8 | - | B 14 |
| 66 | B | 5 | - | D 12 | 82 | B | 6 | - | C 15 | 98 | B | 7 | - | C 14 | 114 | B | 8 | - | C 1 |
| 67 | C | 5 | - | F 1 | 83 | C | 6 | - | A 3 | 99 | C | 7 | - | F 3 | 115 | C | 8 | - | P 4 |
| 68 | D | 5 | - | M 11 | 84 | D | 6 | - | M 12 | 100 | D | 7 | - | N 13 | 116 | D | 8 | - | M 14 |
| 69 | E | 5 | - | C 16 | 85 | E | 6 | - | G 1 | 101 | E | 7 | - | D 2 | 117 | E | 8 | - | H 3 |
| 70 | F | 5 | - | F 14 | 86 | F | 6 | - | J 13 | 102 | F | 7 | - | F 16 | 118 | F | 8 | - | J 15 |
| 71 | G | 5 | - | E 1 | 87 | G | 6 | - | K 2 | 103 | G | 7 | - | D 3 | 119 | G | 8 | - | J 4 |
| 72 | H | 5 | - | P 15 | 88 | H | 6 | - | A 1 | 104 | H | 7 | - | P 1 | 120 | H | 8 | - | P 2 |
| 73 | I | 5 | - | G 16 | 89 | I | 6 | - | H 1 | 105 | I | 7 | - | G 2 | 121 | I | 8 | - | G 3 |
| 74 | J | 5 | - | J 14 | 90 | J | 6 | - | K 15 | 106 | J | 7 | - | K 16 | 122 | J | 8 | - | K 1 |
| 75 | K | 5 | - | I 1 | 91 | K | 6 | - | J 10 | 107 | K | 7 | - | I 3 | 123 | K | 8 | - | K 12 |
| 76 | L | 5 | - | D 11 | 92 | L | 6 | - | E 12 | 108 | L | 7 | - | D 13 | 124 | L | 8 | - | E 14 |
| 77 | M | 5 | - | P 10 | 93 | M | 6 | - | L 1 | 109 | M | 7 | - | A 13 | 125 | M | 8 | - | L 3 |
| 78 | N | 5 | - | N 14 | 94 | N | 6 | - | O 13 | 110 | N | 7 | - | N 16 | 126 | N | 8 | - | A 16 |
| 79 | O | 5 | - | N 9 | 95 | O | 6 | - | L 2 | 111 | O | 7 | - | N 11 | 127 | O | 8 | - | M 4 |
| 80 | P | 5 | - | I 11 | 96 | P | 6 | - | I 16 | 112 | P | 7 | - | M 13 | 128 | P | 8 | - | I 2 |

| 9 | From | - | To | | 10 | From | - | To | | 11 | From | - | To | | 12 | From | - | To | |
|---|---|---|---|---|---|---|---|---|---|---|---|---|---|---|---|---|---|---|---|
| 129 | A | 9 | - | H | 14 | 145 | A | 10 | - | O | 15 | 161 | A | 11 | - | H | 16 | 177 | A | 12 | - | B | 2 |
| 130 | B | 9 | - | D | 16 | 146 | B | 10 | - | C | 3 | 162 | B | 11 | - | C | 2 | 178 | B | 12 | - | C | 5 |
| 131 | C | 9 | - | F | 5 | 147 | C | 10 | - | A | 7 | 163 | C | 11 | - | F | 7 | 179 | C | 12 | - | A | 9 |
| 132 | D | 9 | - | M | 15 | 148 | D | 10 | - | L | 16 | 164 | D | 11 | - | N | 1 | 180 | D | 12 | - | M | 2 |
| 133 | E | 9 | - | C | 4 | 149 | E | 10 | - | G | 5 | 165 | E | 11 | - | C | 6 | 181 | E | 12 | - | J | 7 |
| 134 | F | 9 | - | F | 2 | 150 | F | 10 | - | J | 1 | 166 | F | 11 | - | F | 4 | 182 | F | 12 | - | J | 3 |
| 135 | G | 9 | - | E | 5 | 151 | G | 10 | - | K | 6 | 167 | G | 11 | - | G | 7 | 183 | G | 12 | - | J | 8 |
| 136 | H | 9 | - | P | 3 | 152 | H | 10 | - | A | 5 | 168 | H | 11 | - | P | 5 | 184 | H | 12 | - | E | 7 |
| 137 | I | 9 | - | G | 4 | 153 | I | 10 | - | H | 5 | 169 | I | 11 | - | G | 6 | 185 | I | 12 | - | N | 7 |
| 138 | J | 9 | - | J | 2 | 154 | J | 10 | - | K | 3 | 170 | J | 11 | - | K | 4 | 186 | J | 12 | - | K | 5 |
| 139 | K | 9 | - | I | 5 | 155 | K | 10 | - | O | 14 | 171 | K | 11 | - | H | 7 | 187 | K | 12 | - | O | 16 |
| 140 | L | 9 | - | E | 15 | 156 | L | 10 | - | E | 16 | 172 | L | 11 | - | D | 1 | 188 | L | 12 | - | E | 2 |
| 141 | M | 9 | - | B | 15 | 157 | M | 10 | - | M | 5 | 173 | M | 11 | - | B | 1 | 189 | M | 12 | - | K | 7 |
| 142 | N | 9 | - | N | 2 | 158 | N | 10 | - | O | 1 | 174 | N | 11 | - | N | 4 | 190 | N | 12 | - | A | 4 |
| 143 | O | 9 | - | A | 14 | 159 | O | 10 | - | L | 6 | 175 | O | 11 | - | B | 16 | 191 | O | 12 | - | L | 8 |
| 144 | P | 9 | - | N | 15 | 160 | P | 10 | - | I | 4 | 176 | P | 11 | - | M | 1 | 192 | P | 12 | - | H | 6 |

| 13 | From | | To | |
|---|---|---|---|---|
| 193 | A | 13 - | H | 2 |
| 194 | B | 13 - | D | 4 |
| 195 | C | 13 - | G | 9 |
| 196 | D | 13 - | M | 3 |
| 197 | E | 13 - | E | 8 |
| 198 | F | 13 - | F | 6 |
| 199 | G | 13 - | D | 9 |
| 200 | H | 13 - | P | 7 |
| 201 | I | 13 - | G | 8 |
| 202 | J | 13 - | J | 6 |
| 203 | K | 13 - | H | 9 |
| 204 | L | 13 - | E | 3 |
| 205 | M | 13 - | B | 3 |
| 206 | N | 13 - | N | 6 |
| 207 | O | 13 - | A | 2 |
| 208 | P | 13 - | N | 3 |

| 14 | From | | To | |
|---|---|---|---|---|
| 209 | A | 14 - | O | 3 |
| 210 | B | 14 - | A | 8 |
| 211 | C | 14 - | A | 11 |
| 212 | D | 14 - | L | 4 |
| 213 | E | 14 - | J | 9 |
| 214 | F | 14 - | J | 5 |
| 215 | G | 14 - | M | 10 |
| 216 | H | 14 - | K | 9 |
| 217 | I | 14 - | M | 9 |
| 218 | J | 14 - | O | 7 |
| 219 | K | 14 - | O | 2 |
| 220 | L | 14 - | E | 4 |
| 221 | M | 14 - | P | 9 |
| 222 | N | 14 - | O | 5 |
| 223 | O | 14 - | O | 10 |
| 224 | P | 14 - | H | 8 |

| 15 | From | | To | |
|---|---|---|---|---|
| 225 | A | 15 - | H | 4 |
| 226 | B | 15 - | E | 6 |
| 227 | C | 15 - | H | 11 |
| 228 | D | 15 - | N | 5 |
| 229 | E | 15 - | G | 10 |
| 230 | F | 15 - | K | 8 |
| 231 | G | 15 - | G | 11 |
| 232 | H | 15 - | B | 10 |
| 233 | I | 15 - | H | 10 |
| 234 | J | 15 - | N | 8 |
| 235 | K | 15 - | J | 11 |
| 236 | L | 15 - | D | 5 |
| 237 | M | 15 - | B | 5 |
| 238 | N | 15 - | O | 8 |
| 239 | O | 15 - | B | 4 |
| 240 | P | 15 - | B | 6 |

| 16 | From | | To | |
|---|---|---|---|---|
| 241 | A | 16 - | A | 6 |
| 242 | B | 16 - | A | 10 |
| 243 | C | 16 - | O | 4 |
| 244 | D | 16 - | M | 6 |
| 245 | E | 16 - | K | 11 |
| 246 | F | 16 - | B | 8 |
| 247 | G | 16 - | L | 12 |
| 248 | H | 16 - | O | 11 |
| 249 | I | 16 - | B | 12 |
| 250 | J | 16 - | K | 10 |
| 251 | K | 16 - | O | 6 |
| 252 | L | 16 - | B | 7 |
| 253 | M | 16 - | O | 12 |
| 254 | N | 16 - | B | 9 |
| 255 | O | 16 - | B | 13 |
| 256 | P | 16 - | B | 11 |

FIG. 6D

|   | A | B | C | D | E | F | G | H | I | J | K | L | M | N | O | P |
|---|---|---|---|---|---|---|---|---|---|---|---|---|---|---|---|---|
| 1 | 88 | 173 | 114 | 172 | 71 | 67 | 85 | 89 | 75 | 150 | 122 | 93 | 176 | 164 | 158 | 104 |
| 2 | 207 | 177 | 162 | 101 | 188 | 134 | 105 | 193 | 128 | 138 | 87 | 95 | 180 | 142 | 219 | 120 |
| 3 | 83 | 205 | 146 | 103 | 204 | 99 | 121 | 117 | 107 | 182 | 154 | 125 | 196 | 208 | 209 | 136 |
| 4 | 190 | 239 | 133 | 194 | 220 | 166 | 137 | 225 | 160 | 119 | 170 | 212 | 127 | 174 | 243 | 115 |
| 5 | 152 | 237 | 178 | 236 | 135 | 131 | 149 | 153 | 139 | 214 | 186 | 15 | 157 | 228 | 222 | 168 |
| 6 | 241 | 240 | 165 | 1 | 226 | 198 | 169 | 192 | 27 | 202 | 151 | 159 | 244 | 206 | 251 | 13 |
| 7 | 147 | 252 | 17 | 12 | 184 | 163 | 167 | 171 | 16 | 181 | 189 | 47 | 4 | 185 | 218 | 200 |
| 8 | 210 | 246 | 2 | 28 | 197 | 33 | 201 | 224 | 59 | 183 | 230 | 191 | 20 | 234 | 238 | 45 |
| 9 | 179 | 254 | 49 | 199 | 22 | 44 | 195 | 203 | 48 | 213 | 216 | 36 | 217 | 79 | 30 | 221 |
| 10 | 242 | 232 | 65 | 34 | 60 | 6 | 229 | 233 | 10 | 91 | 250 | 52 | 215 | 14 | 223 | 77 |
| 11 | 211 | 256 | 18 | 76 | 81 | 54 | 231 | 227 | 80 | 235 | 245 | 26 | 68 | 111 | 248 | 8 |
| 12 | 62 | 249 | 5 | 66 | 92 | 38 | 9 | 97 | 32 | 42 | 123 | 247 | 84 | 46 | 253 | 24 |
| 13 | 109 | 255 | 50 | 108 | 7 | 3 | 21 | 25 | 11 | 86 | 58 | 29 | 112 | 100 | 94 | 40 |
| 14 | 143 | 113 | 98 | 37 | 124 | 70 | 41 | 129 | 64 | 74 | 23 | 31 | 116 | 78 | 155 | 56 |
| 15 | 19 | 141 | 82 | 39 | 140 | 35 | 57 | 53 | 43 | 118 | 90 | 61 | 132 | 144 | 145 | 72 |
| 16 | 126 | 175 | 69 | 130 | 156 | 102 | 73 | 161 | 96 | 55 | 106 | 148 | 63 | 110 | 187 | 51 |

FIG. 7

Stumbling signature

| 1 | 2 | 3 | 4 |
|---|---|---|---|
| V slice | V shift | H slice | H shift |
| 1 | 1 | 1 | 1 |

Original Positions (1-1-1-1)

|    | A | B | C | D | E | F | G | H | I | J | K | L | M | N | O | P |
|----|---|---|---|---|---|---|---|---|---|---|---|---|---|---|---|---|
| 1  | 1 | 2 | 3 | 4 | 5 | 6 | 7 | 8 | 9 | 10 | 11 | 12 | 13 | 14 | 15 | 16 |
| 2  | 17 | 18 | 19 | 20 | 21 | 22 | 23 | 24 | 25 | 26 | 27 | 28 | 29 | 30 | 31 | 32 |
| 3  | 33 | 34 | 35 | 36 | 37 | 38 | 39 | 40 | 41 | 42 | 43 | 44 | 45 | 46 | 47 | 48 |
| 4  | 49 | 50 | 51 | 52 | 53 | 54 | 55 | 56 | 57 | 58 | 59 | 60 | 61 | 62 | 63 | 64 |
| 5  | 65 | 66 | 67 | 68 | 69 | 70 | 71 | 72 | 73 | 74 | 75 | 76 | 77 | 78 | 79 | 80 |
| 6  | 81 | 82 | 83 | 84 | 85 | 86 | 87 | 88 | 89 | 90 | 91 | 92 | 93 | 94 | 95 | 96 |
| 7  | 97 | 98 | 99 | 100 | 101 | 102 | 103 | 104 | 105 | 106 | 107 | 108 | 109 | 110 | 111 | 112 |
| 8  | 113 | 114 | 115 | 116 | 117 | 118 | 119 | 120 | 121 | 122 | 123 | 124 | 125 | 126 | 127 | 128 |
| 9  | 129 | 130 | 131 | 132 | 133 | 134 | 135 | 136 | 137 | 138 | 139 | 140 | 141 | 142 | 143 | 144 |
| 10 | 145 | 146 | 147 | 148 | 149 | 150 | 151 | 152 | 153 | 154 | 155 | 156 | 157 | 158 | 159 | 160 |
| 11 | 161 | 162 | 163 | 164 | 165 | 166 | 167 | 168 | 169 | 170 | 171 | 172 | 173 | 174 | 175 | 176 |
| 12 | 177 | 178 | 179 | 180 | 181 | 182 | 183 | 184 | 185 | 186 | 187 | 188 | 189 | 190 | 191 | 192 |
| 13 | 193 | 194 | 195 | 196 | 197 | 198 | 199 | 200 | 201 | 202 | 203 | 204 | 205 | 206 | 207 | 208 |
| 14 | 209 | 210 | 211 | 212 | 213 | 214 | 215 | 216 | 217 | 218 | 219 | 220 | 221 | 222 | 223 | 224 |
| 15 | 225 | 226 | 227 | 228 | 229 | 230 | 231 | 232 | 233 | 234 | 235 | 236 | 237 | 238 | 239 | 240 |
| 16 | 241 | 242 | 243 | 244 | 245 | 246 | 247 | 248 | 249 | 250 | 251 | 252 | 253 | 254 | 255 | 256 |

| 1   |     |     |     |     |     |     |     |     |     |     |     |     |     |     |     |
| --- | --- | --- | --- | --- | --- | --- | --- | --- | --- | --- | --- | --- | --- | --- | --- |
| 17  |     |     |     |     |     |     |     |     |     |     |     |     |     |     |     |
| 33  | 2   | 3   | 4   | 5   | 6   | 7   | 8   | 9   | 10  | 11  | 12  | 13  | 14  | 15  | 16  |
| 49  | 18  | 19  | 20  | 21  | 22  | 23  | 24  | 25  | 26  | 27  | 28  | 29  | 30  | 31  | 32  |
| 65  | 34  | 35  | 36  | 37  | 38  | 39  | 40  | 41  | 42  | 43  | 44  | 45  | 46  | 47  | 48  |
| 81  | 50  | 51  | 52  | 53  | 54  | 55  | 56  | 57  | 58  | 59  | 60  | 61  | 62  | 63  | 64  |
| 97  | 66  | 67  | 68  | 69  | 70  | 71  | 72  | 73  | 74  | 75  | 76  | 77  | 78  | 79  | 80  |
| 113 | 82  | 83  | 84  | 85  | 86  | 87  | 88  | 89  | 90  | 91  | 92  | 93  | 94  | 95  | 96  |
| 129 | 98  | 99  | 100 | 101 | 102 | 103 | 104 | 105 | 106 | 107 | 108 | 109 | 110 | 111 | 112 |
| 145 | 114 | 115 | 116 | 117 | 118 | 119 | 120 | 121 | 122 | 123 | 124 | 125 | 126 | 127 | 128 |
| 161 | 130 | 131 | 132 | 133 | 134 | 135 | 136 | 137 | 138 | 139 | 140 | 141 | 142 | 143 | 144 |
| 177 | 146 | 147 | 148 | 149 | 150 | 151 | 152 | 153 | 154 | 155 | 156 | 157 | 158 | 159 | 160 |
| 193 | 162 | 163 | 164 | 165 | 166 | 167 | 168 | 169 | 170 | 171 | 172 | 173 | 174 | 175 | 176 |
| 209 | 178 | 179 | 180 | 181 | 182 | 183 | 184 | 185 | 186 | 187 | 188 | 189 | 190 | 191 | 192 |
| 225 | 194 | 195 | 196 | 197 | 198 | 199 | 200 | 201 | 202 | 203 | 204 | 205 | 206 | 207 | 208 |
| 241 | 210 | 211 | 212 | 213 | 214 | 215 | 216 | 217 | 218 | 219 | 220 | 221 | 222 | 223 | 224 |
|     | 226 | 227 | 228 | 229 | 230 | 231 | 232 | 233 | 234 | 235 | 236 | 237 | 238 | 239 | 240 |
|     | 242 | 243 | 244 | 245 | 246 | 247 | 248 | 249 | 250 | 251 | 252 | 253 | 254 | 255 | 256 |

| 17 | 242 | 243 | 244 | 245 | 246 | 247 | 248 | 249 | 250 | 251 | 252 | 253 | 254 | 255 | 256 |
|---|---|---|---|---|---|---|---|---|---|---|---|---|---|---|---|
| 33 | 2 | 3 | 4 | 5 | 6 | 7 | 8 | 9 | 10 | 11 | 12 | 13 | 14 | 15 | 16 |
| 49 | 18 | 19 | 20 | 21 | 22 | 23 | 24 | 25 | 26 | 27 | 28 | 29 | 30 | 31 | 32 |
| 65 | 34 | 35 | 36 | 37 | 38 | 39 | 40 | 41 | 42 | 43 | 44 | 45 | 46 | 47 | 48 |
| 81 | 50 | 51 | 52 | 53 | 54 | 55 | 56 | 57 | 58 | 59 | 60 | 61 | 62 | 63 | 64 |
| 97 | 66 | 67 | 68 | 69 | 70 | 71 | 72 | 73 | 74 | 75 | 76 | 77 | 78 | 79 | 80 |
| 113 | 82 | 83 | 84 | 85 | 86 | 87 | 88 | 89 | 90 | 91 | 92 | 93 | 94 | 95 | 96 |
| 129 | 98 | 99 | 100 | 101 | 102 | 103 | 104 | 105 | 106 | 107 | 108 | 109 | 110 | 111 | 112 |
| 145 | 114 | 115 | 116 | 117 | 118 | 119 | 120 | 121 | 122 | 123 | 124 | 125 | 126 | 127 | 128 |
| 161 | 130 | 131 | 132 | 133 | 134 | 135 | 136 | 137 | 138 | 139 | 140 | 141 | 142 | 143 | 144 |
| 177 | 146 | 147 | 148 | 149 | 150 | 151 | 152 | 153 | 154 | 155 | 156 | 157 | 158 | 159 | 160 |
| 193 | 162 | 163 | 164 | 165 | 166 | 167 | 168 | 169 | 170 | 171 | 172 | 173 | 174 | 175 | 176 |
| 209 | 178 | 179 | 180 | 181 | 182 | 183 | 184 | 185 | 186 | 187 | 188 | 189 | 190 | 191 | 192 |
| 225 | 194 | 195 | 196 | 197 | 198 | 199 | 200 | 201 | 202 | 203 | 204 | 205 | 206 | 207 | 208 |
| 241 | 210 | 211 | 212 | 213 | 214 | 215 | 216 | 217 | 218 | 219 | 220 | 221 | 222 | 223 | 224 |
| 1 | 226 | 227 | 228 | 229 | 230 | 231 | 232 | 233 | 234 | 235 | 236 | 237 | 238 | 239 | 240 |

| 17  | 242 | 243 | 244 | 245 | 246 | 247 | 248 | 249 | 250 | 251 | 252 | 253 | 254 | 255 | 256 |     |
|-----|-----|-----|-----|-----|-----|-----|-----|-----|-----|-----|-----|-----|-----|-----|-----|-----|
| 33  | 2   | 3   | 4   | 5   | 6   | 7   | 8   | 9   | 10  | 11  | 12  | 13  | 14  | 15  | 16  |     |
| 49  | 18  | 19  | 20  | 21  | 22  | 23  | 24  | 25  | 26  | 27  | 28  | 29  | 30  | 31  | 32  |     |
| 65  | 34  | 35  | 36  | 37  | 38  | 39  | 40  | 41  | 42  | 43  | 44  | 45  | 46  | 47  | 48  |     |
| 81  | 50  | 51  | 52  | 53  | 54  | 55  | 56  | 57  | 58  | 59  | 60  | 61  | 62  | 63  | 64  |     |
| 97  | 66  | 67  | 68  | 69  | 70  | 71  | 72  | 73  | 74  | 75  | 76  | 77  | 78  | 79  | 80  |     |
| 113 | 82  | 83  | 84  | 85  | 86  | 87  | 88  | 89  | 90  | 91  | 92  | 93  | 94  | 95  | 96  |     |
| 129 | 98  | 99  | 100 | 101 | 102 | 103 | 104 | 105 | 106 | 107 | 108 | 109 | 110 | 111 | 112 |     |
| 145 | 114 | 115 | 116 | 117 | 118 | 119 | 120 | 121 | 122 | 123 | 124 | 125 | 126 | 127 | 128 |     |
| 161 | 130 | 131 | 132 | 133 | 134 | 135 | 136 | 137 | 138 | 139 | 140 | 141 | 142 | 143 | 144 |     |
| 177 | 146 | 147 | 148 | 149 | 150 | 151 | 152 | 153 | 154 | 155 | 156 | 157 | 158 | 159 | 160 |     |
| 193 | 162 | 163 | 164 | 165 | 166 | 167 | 168 | 169 | 170 | 171 | 172 | 173 | 174 | 175 | 176 |     |
| 209 | 178 | 179 | 180 | 181 | 182 | 183 | 184 | 185 | 186 | 187 | 188 | 189 | 190 | 191 | 192 |     |
| 225 | 194 | 195 | 196 | 197 | 198 | 199 | 200 | 201 | 202 | 203 | 204 | 205 | 206 | 207 | 208 |     |
| 241 | 210 | 211 | 212 | 213 | 214 | 215 | 216 | 217 | 218 | 219 | 220 | 221 | 222 | 223 | 224 |     |
|     | 1   | 226 | 227 | 228 | 229 | 230 | 231 | 232 | 233 | 234 | 235 | 236 | 237 | 238 | 239 | 240 |

Final Positions (1-1-1-1)

| | A | B | C | D | E | F | G | H | I | J | K | L | M | N | O | P |
|---|---|---|---|---|---|---|---|---|---|---|---|---|---|---|---|---|
| 1 | 242 | 243 | 244 | 245 | 246 | 247 | 248 | 249 | 250 | 251 | 252 | 253 | 254 | 255 | 256 | 17 |
| 2 | 2 | 3 | 4 | 5 | 6 | 7 | 8 | 9 | 10 | 11 | 12 | 13 | 14 | 15 | 16 | 33 |
| 3 | 18 | 19 | 20 | 21 | 22 | 23 | 24 | 25 | 26 | 27 | 28 | 29 | 30 | 31 | 32 | 49 |
| 4 | 34 | 35 | 36 | 37 | 38 | 39 | 40 | 41 | 42 | 43 | 44 | 45 | 46 | 47 | 48 | 65 |
| 5 | 50 | 51 | 52 | 53 | 54 | 55 | 56 | 57 | 58 | 59 | 60 | 61 | 62 | 63 | 64 | 81 |
| 6 | 66 | 67 | 68 | 69 | 70 | 71 | 72 | 73 | 74 | 75 | 76 | 77 | 78 | 79 | 80 | 97 |
| 7 | 82 | 83 | 84 | 85 | 86 | 87 | 88 | 89 | 90 | 91 | 92 | 93 | 94 | 95 | 96 | 113 |
| 8 | 98 | 99 | 100 | 101 | 102 | 103 | 104 | 105 | 106 | 107 | 108 | 109 | 110 | 111 | 112 | 129 |
| 9 | 114 | 115 | 116 | 117 | 118 | 119 | 120 | 121 | 122 | 123 | 124 | 125 | 126 | 127 | 128 | 145 |
| 10 | 130 | 131 | 132 | 133 | 134 | 135 | 136 | 137 | 138 | 139 | 140 | 141 | 142 | 143 | 144 | 161 |
| 11 | 146 | 147 | 148 | 149 | 150 | 151 | 152 | 153 | 154 | 155 | 156 | 157 | 158 | 159 | 160 | 177 |
| 12 | 162 | 163 | 164 | 165 | 166 | 167 | 168 | 169 | 170 | 171 | 172 | 173 | 174 | 175 | 176 | 193 |
| 13 | 178 | 179 | 180 | 181 | 182 | 183 | 184 | 185 | 186 | 187 | 188 | 189 | 190 | 191 | 192 | 209 |
| 14 | 194 | 195 | 196 | 197 | 198 | 199 | 200 | 201 | 202 | 203 | 204 | 205 | 206 | 207 | 208 | 225 |
| 15 | 210 | 211 | 212 | 213 | 214 | 215 | 216 | 217 | 218 | 219 | 220 | 221 | 222 | 223 | 224 | 241 |
| 16 | 240 | 1 | 226 | 227 | 228 | 229 | 230 | 231 | 232 | 233 | 234 | 235 | 236 | 237 | 238 | 239 |

Stumbling signature

| 1 | 2 | 3 | 4 |
|---|---|---|---|
| V slice | V shift | H slice | H shift |
| 2 | 3 | 2 | 2 |

Original Positions (2-3-2-2)

|    | A | B | C | D | E | F | G | H | I | J | K | L | M | N | O | P |
|----|---|---|---|---|---|---|---|---|---|---|---|---|---|---|---|---|
| 1  | 1 | 2 | 3 | 4 | 5 | 6 | 7 | 8 | 9 | 10 | 11 | 12 | 13 | 14 | 15 | 16 |
| 2  | 17 | 18 | 19 | 20 | 21 | 22 | 23 | 24 | 25 | 26 | 27 | 28 | 29 | 30 | 31 | 32 |
| 3  | 33 | 34 | 35 | 36 | 37 | 38 | 39 | 40 | 41 | 42 | 43 | 44 | 45 | 46 | 47 | 48 |
| 4  | 49 | 50 | 51 | 52 | 53 | 54 | 55 | 56 | 57 | 58 | 59 | 60 | 61 | 62 | 63 | 64 |
| 5  | 65 | 66 | 67 | 68 | 69 | 70 | 71 | 72 | 73 | 74 | 75 | 76 | 77 | 78 | 79 | 80 |
| 6  | 81 | 82 | 83 | 84 | 85 | 86 | 87 | 88 | 89 | 90 | 91 | 92 | 93 | 94 | 95 | 96 |
| 7  | 97 | 98 | 99 | 100 | 101 | 102 | 103 | 104 | 105 | 106 | 107 | 108 | 109 | 110 | 111 | 112 |
| 8  | 113 | 114 | 115 | 116 | 117 | 118 | 119 | 120 | 121 | 122 | 123 | 124 | 125 | 126 | 127 | 128 |
| 9  | 129 | 130 | 131 | 132 | 133 | 134 | 135 | 136 | 137 | 138 | 139 | 140 | 141 | 142 | 143 | 144 |
| 10 | 145 | 146 | 147 | 148 | 149 | 150 | 151 | 152 | 153 | 154 | 155 | 156 | 157 | 158 | 159 | 160 |
| 11 | 161 | 162 | 163 | 164 | 165 | 166 | 167 | 168 | 169 | 170 | 171 | 172 | 173 | 174 | 175 | 176 |
| 12 | 177 | 178 | 179 | 180 | 181 | 182 | 183 | 184 | 185 | 186 | 187 | 188 | 189 | 190 | 191 | 192 |
| 13 | 193 | 194 | 195 | 196 | 197 | 198 | 199 | 200 | 201 | 202 | 203 | 204 | 205 | 206 | 207 | 208 |
| 14 | 209 | 210 | 211 | 212 | 213 | 214 | 215 | 216 | 217 | 218 | 219 | 220 | 221 | 222 | 223 | 224 |
| 15 | 225 | 226 | 227 | 228 | 229 | 230 | 231 | 232 | 233 | 234 | 235 | 236 | 237 | 238 | 239 | 240 |
| 16 | 241 | 242 | 243 | 244 | 245 | 246 | 247 | 248 | 249 | 250 | 251 | 252 | 253 | 254 | 255 | 256 |

FIG. 9A

| 1 | 2 | | | | | | | | | | | | | | |
|---|---|---|---|---|---|---|---|---|---|---|---|---|---|---|---|
| 17 | 18 | | | | | | | | | | | | | | |
| 33 | 34 | | | | | | | | | | | | | | |
| 49 | 50 | | | | | | | | | | | | | | |
| 65 | 66 | | | | | | | | | | | | | | |
| 81 | 82 | | | | | | | | | | | | | | |
| 97 | 98 | 3 | 4 | 5 | 6 | 7 | 8 | 9 | 10 | 11 | 12 | 13 | 14 | 15 | 16 |
| 113 | 114 | 19 | 20 | 21 | 22 | 23 | 24 | 25 | 26 | 27 | 28 | 29 | 30 | 31 | 32 |
| 129 | 130 | 35 | 36 | 37 | 38 | 39 | 40 | 41 | 42 | 43 | 44 | 45 | 46 | 47 | 48 |
| 145 | 146 | 51 | 52 | 53 | 54 | 55 | 56 | 57 | 58 | 59 | 60 | 61 | 62 | 63 | 64 |
| 161 | 162 | 67 | 68 | 69 | 70 | 71 | 72 | 73 | 74 | 75 | 76 | 77 | 78 | 79 | 80 |
| 177 | 178 | 83 | 84 | 85 | 86 | 87 | 88 | 89 | 90 | 91 | 92 | 93 | 94 | 95 | 96 |
| 193 | 194 | 99 | 100 | 101 | 102 | 103 | 104 | 105 | 106 | 107 | 108 | 109 | 110 | 111 | 112 |
| 209 | 210 | 115 | 116 | 117 | 118 | 119 | 120 | 121 | 122 | 123 | 124 | 125 | 126 | 127 | 128 |
| 225 | 226 | 131 | 132 | 133 | 134 | 135 | 136 | 137 | 138 | 139 | 140 | 141 | 142 | 143 | 144 |
| 241 | 242 | 147 | 148 | 149 | 150 | 151 | 152 | 153 | 154 | 155 | 156 | 157 | 158 | 159 | 160 |
| | | 163 | 164 | 165 | 166 | 167 | 168 | 169 | 170 | 171 | 172 | 173 | 174 | 175 | 176 |
| | | 179 | 180 | 181 | 182 | 183 | 184 | 185 | 186 | 187 | 188 | 189 | 190 | 191 | 192 |
| | | 195 | 196 | 197 | 198 | 199 | 200 | 201 | 202 | 203 | 204 | 205 | 206 | 207 | 208 |
| | | 211 | 212 | 213 | 214 | 215 | 216 | 217 | 218 | 219 | 220 | 221 | 222 | 223 | 224 |
| | | 227 | 228 | 229 | 230 | 231 | 232 | 233 | 234 | 235 | 236 | 237 | 238 | 239 | 240 |
| | | 243 | 244 | 245 | 246 | 247 | 248 | 249 | 250 | 251 | 252 | 253 | 254 | 255 | 256 |

| 49 | 50 | 211 | 212 | 213 | 214 | 215 | 216 | 217 | 218 | 219 | 220 | 221 | 222 | 223 | 224 |
|---|---|---|---|---|---|---|---|---|---|---|---|---|---|---|---|
| 65 | 66 | 227 | 228 | 229 | 230 | 231 | 232 | 233 | 234 | 235 | 236 | 237 | 238 | 239 | 240 |
| 81 | 82 | 243 | 244 | 245 | 246 | 247 | 248 | 249 | 250 | 251 | 252 | 253 | 254 | 255 | 256 |
| 97 | 98 | 3 | 4 | 5 | 6 | 7 | 8 | 9 | 10 | 11 | 12 | 13 | 14 | 15 | 16 |
| 113 | 114 | 19 | 20 | 21 | 22 | 23 | 24 | 25 | 26 | 27 | 28 | 29 | 30 | 31 | 32 |
| 129 | 130 | 35 | 36 | 37 | 38 | 39 | 40 | 41 | 42 | 43 | 44 | 45 | 46 | 47 | 48 |
| 145 | 146 | 51 | 52 | 53 | 54 | 55 | 56 | 57 | 58 | 59 | 60 | 61 | 62 | 63 | 64 |
| 161 | 162 | 67 | 68 | 69 | 70 | 71 | 72 | 73 | 74 | 75 | 76 | 77 | 78 | 79 | 80 |
| 177 | 178 | 83 | 84 | 85 | 86 | 87 | 88 | 89 | 90 | 91 | 92 | 93 | 94 | 95 | 96 |
| 193 | 194 | 99 | 100 | 101 | 102 | 103 | 104 | 105 | 106 | 107 | 108 | 109 | 110 | 111 | 112 |
| 209 | 210 | 115 | 116 | 117 | 118 | 119 | 120 | 121 | 122 | 123 | 124 | 125 | 126 | 127 | 128 |
| 225 | 226 | 131 | 132 | 133 | 134 | 135 | 136 | 137 | 138 | 139 | 140 | 141 | 142 | 143 | 144 |
| 241 | 242 | 147 | 148 | 149 | 150 | 151 | 152 | 153 | 154 | 155 | 156 | 157 | 158 | 159 | 160 |
| 1 | 2 | 163 | 164 | 165 | 166 | 167 | 168 | 169 | 170 | 171 | 172 | 173 | 174 | 175 | 176 |
| 17 | 18 | 179 | 180 | 181 | 182 | 183 | 184 | 185 | 186 | 187 | 188 | 189 | 190 | 191 | 192 |
| 33 | 34 | 195 | 196 | 197 | 198 | 199 | 200 | 201 | 202 | 203 | 204 | 205 | 206 | 207 | 208 |

| 49 | 50 | 211 | 212 | 213 | 214 | 215 | 216 | 217 | 218 | 219 | 220 | 221 | 222 | 223 | 224 | | | | |
|---|---|---|---|---|---|---|---|---|---|---|---|---|---|---|---|---|---|---|---|
| 65 | 66 | 227 | 228 | 229 | 230 | 231 | 232 | 233 | 234 | 235 | 236 | 237 | 238 | 239 | 240 | | | | |
| 81 | 82 | 243 | 244 | 245 | 246 | 247 | 248 | 249 | 250 | 251 | 252 | 253 | 254 | 255 | 256 | | | | |
| 97 | 98 | 3 | 4 | 5 | 6 | 7 | 8 | 9 | 10 | 11 | 12 | 13 | 14 | 15 | 16 | | | | |
| 113 | 114 | 19 | 20 | 21 | 22 | 23 | 24 | 25 | 26 | 27 | 28 | 29 | 30 | 31 | 32 | | | | |
| 129 | 130 | 35 | 36 | 37 | 38 | 39 | 40 | 41 | 42 | 43 | 44 | 45 | 46 | 47 | 48 | | | | |
| 145 | 146 | 51 | 52 | 53 | 54 | 55 | 56 | 57 | 58 | 59 | 60 | 61 | 62 | 63 | 64 | | | | |
| 161 | 162 | 67 | 68 | 69 | 70 | 71 | 72 | 73 | 74 | 75 | 76 | 77 | 78 | 79 | 80 | | | | |
| 177 | 178 | 83 | 84 | 85 | 86 | 87 | 88 | 89 | 90 | 91 | 92 | 93 | 94 | 95 | 96 | | | | |
| 193 | 194 | 99 | 100 | 101 | 102 | 103 | 104 | 105 | 106 | 107 | 108 | 109 | 110 | 111 | 112 | | | | |
| 209 | 210 | 115 | 116 | 117 | 118 | 119 | 120 | 121 | 122 | 123 | 124 | 125 | 126 | 127 | 128 | | | | |
| 225 | 226 | 131 | 132 | 133 | 134 | 135 | 136 | 137 | 138 | 139 | 140 | 141 | 142 | 143 | 144 | | | | |
| 241 | 242 | 147 | 148 | 149 | 150 | 151 | 152 | 153 | 154 | 155 | 156 | 157 | 158 | 159 | 160 | | | | |
| 1 | 2 | 163 | 164 | 165 | 166 | 167 | 168 | 169 | 170 | 171 | 172 | 173 | 174 | 175 | 176 | | | | |
| | | 17 | 18 | 179 | 180 | 181 | 182 | 183 | 184 | 185 | 186 | 187 | 188 | 189 | 190 | 191 | 192 | | |
| | | 33 | 34 | 195 | 196 | 197 | 198 | 199 | 200 | 201 | 202 | 203 | 204 | 205 | 206 | 207 | 208 | | |

Final Positions (2-3-2-2)                                                                                      900e

| | A | B | C | D | E | F | G | H | I | J | K | L | M | N | O | P |
|---|---|---|---|---|---|---|---|---|---|---|---|---|---|---|---|---|
| 1 | 211 | 212 | 213 | 214 | 215 | 216 | 217 | 218 | 219 | 220 | 221 | 222 | 223 | 224 | 49 | 50 |
| 2 | 227 | 228 | 229 | 230 | 231 | 232 | 233 | 234 | 235 | 236 | 237 | 238 | 239 | 240 | 65 | 66 |
| 3 | 243 | 244 | 245 | 246 | 247 | 248 | 249 | 250 | 251 | 252 | 253 | 254 | 255 | 256 | 81 | 82 |
| 4 | 3 | 4 | 5 | 6 | 7 | 8 | 9 | 10 | 11 | 12 | 13 | 14 | 15 | 16 | 97 | 98 |
| 5 | 19 | 20 | 21 | 22 | 23 | 24 | 25 | 26 | 27 | 28 | 29 | 30 | 31 | 32 | 113 | 114 |
| 6 | 35 | 36 | 37 | 38 | 39 | 40 | 41 | 42 | 43 | 44 | 45 | 46 | 47 | 48 | 129 | 130 |
| 7 | 51 | 52 | 53 | 54 | 55 | 56 | 57 | 58 | 59 | 60 | 61 | 62 | 63 | 64 | 145 | 146 |
| 8 | 67 | 68 | 69 | 70 | 71 | 72 | 73 | 74 | 75 | 76 | 77 | 78 | 79 | 80 | 161 | 162 |
| 9 | 83 | 84 | 85 | 86 | 87 | 88 | 89 | 90 | 91 | 92 | 93 | 94 | 95 | 96 | 177 | 178 |
| 10 | 99 | 100 | 101 | 102 | 103 | 104 | 105 | 106 | 107 | 108 | 109 | 110 | 111 | 112 | 193 | 194 |
| 11 | 115 | 116 | 117 | 118 | 119 | 120 | 121 | 122 | 123 | 124 | 125 | 126 | 127 | 128 | 209 | 210 |
| 12 | 131 | 132 | 133 | 134 | 135 | 136 | 137 | 138 | 139 | 140 | 141 | 142 | 143 | 144 | 225 | 226 |
| 13 | 147 | 148 | 149 | 150 | 151 | 152 | 153 | 154 | 155 | 156 | 157 | 158 | 159 | 160 | 241 | 242 |
| 14 | 163 | 164 | 165 | 166 | 167 | 168 | 169 | 170 | 171 | 172 | 173 | 174 | 175 | 176 | 1 | 2 |
| 15 | 191 | 192 | 17 | 18 | 179 | 180 | 181 | 182 | 183 | 184 | 185 | 186 | 187 | 188 | 189 | 190 |
| 16 | 207 | 208 | 33 | 34 | 195 | 196 | 197 | 198 | 199 | 200 | 201 | 202 | 203 | 204 | 205 | 206 |

Stumbling signature

| 1 | 2 | 3 | 4 |
|---|---|---|---|
| V slice | V shift | H slice | H shift |
| 3 | 4 | 5 | 3 |

Original Positions (3-4-5-3) — 1000a

|    | A | B | C | D | E | F | G | H | I | J | K | L | M | N | O | P |
|----|---|---|---|---|---|---|---|---|---|---|---|---|---|---|---|---|
| 1  | 1 | 2 | 3 | 4 | 5 | 6 | 7 | 8 | 9 | 10 | 11 | 12 | 13 | 14 | 15 | 16 |
| 2  | 17 | 18 | 19 | 20 | 21 | 22 | 23 | 24 | 25 | 26 | 27 | 28 | 29 | 30 | 31 | 32 |
| 3  | 33 | 34 | 35 | 36 | 37 | 38 | 39 | 40 | 41 | 42 | 43 | 44 | 45 | 46 | 47 | 48 |
| 4  | 49 | 50 | 51 | 52 | 53 | 54 | 55 | 56 | 57 | 58 | 59 | 60 | 61 | 62 | 63 | 64 |
| 5  | 65 | 66 | 67 | 68 | 69 | 70 | 71 | 72 | 73 | 74 | 75 | 76 | 77 | 78 | 79 | 80 |
| 6  | 81 | 82 | 83 | 84 | 85 | 86 | 87 | 88 | 89 | 90 | 91 | 92 | 93 | 94 | 95 | 96 |
| 7  | 97 | 98 | 99 | 100 | 101 | 102 | 103 | 104 | 105 | 106 | 107 | 108 | 109 | 110 | 111 | 112 |
| 8  | 113 | 114 | 115 | 116 | 117 | 118 | 119 | 120 | 121 | 122 | 123 | 124 | 125 | 126 | 127 | 128 |
| 9  | 129 | 130 | 131 | 132 | 133 | 134 | 135 | 136 | 137 | 138 | 139 | 140 | 141 | 142 | 143 | 144 |
| 10 | 145 | 146 | 147 | 148 | 149 | 150 | 151 | 152 | 153 | 154 | 155 | 156 | 157 | 158 | 159 | 160 |
| 11 | 161 | 162 | 163 | 164 | 165 | 166 | 167 | 168 | 169 | 170 | 171 | 172 | 173 | 174 | 175 | 176 |
| 12 | 177 | 178 | 179 | 180 | 181 | 182 | 183 | 184 | 185 | 186 | 187 | 188 | 189 | 190 | 191 | 192 |
| 13 | 193 | 194 | 195 | 196 | 197 | 198 | 199 | 200 | 201 | 202 | 203 | 204 | 205 | 206 | 207 | 208 |
| 14 | 209 | 210 | 211 | 212 | 213 | 214 | 215 | 216 | 217 | 218 | 219 | 220 | 221 | 222 | 223 | 224 |
| 15 | 225 | 226 | 227 | 228 | 229 | 230 | 231 | 232 | 233 | 234 | 235 | 236 | 237 | 238 | 239 | 240 |
| 16 | 241 | 242 | 243 | 244 | 245 | 246 | 247 | 248 | 249 | 250 | 251 | 252 | 253 | 254 | 255 | 256 |

| 65 | 66 | 67 | 196 | 197 | 198 | 199 | 200 | 201 | 202 | 203 | 204 | 205 | 206 | 207 | 208 |
|---|---|---|---|---|---|---|---|---|---|---|---|---|---|---|---|
| 81 | 82 | 83 | 212 | 213 | 214 | 215 | 216 | 217 | 218 | 219 | 220 | 221 | 222 | 223 | 224 |
| 97 | 98 | 99 | 228 | 229 | 230 | 231 | 232 | 233 | 234 | 235 | 236 | 237 | 238 | 239 | 240 |
| 113 | 114 | 115 | 244 | 245 | 246 | 247 | 248 | 249 | 250 | 251 | 252 | 253 | 254 | 255 | 256 |
| 129 | 130 | 131 | 4 | 5 | 6 | 7 | 8 | 9 | 10 | 11 | 12 | 13 | 14 | 15 | 16 |
| 145 | 146 | 147 | 20 | 21 | 22 | 23 | 24 | 25 | 26 | 27 | 28 | 29 | 30 | 31 | 32 |
| 161 | 162 | 163 | 36 | 37 | 38 | 39 | 40 | 41 | 42 | 43 | 44 | 45 | 46 | 47 | 48 |
| 177 | 178 | 179 | 52 | 53 | 54 | 55 | 56 | 57 | 58 | 59 | 60 | 61 | 62 | 63 | 64 |
| 193 | 194 | 195 | 68 | 69 | 70 | 71 | 72 | 73 | 74 | 75 | 76 | 77 | 78 | 79 | 80 |
| 209 | 210 | 211 | 84 | 85 | 86 | 87 | 88 | 89 | 90 | 91 | 92 | 93 | 94 | 95 | 96 |
| 225 | 226 | 227 | 100 | 101 | 102 | 103 | 104 | 105 | 106 | 107 | 108 | 109 | 110 | 111 | 112 |
| 241 | 242 | 243 | 116 | 117 | 118 | 119 | 120 | 121 | 122 | 123 | 124 | 125 | 126 | 127 | 128 |
| 1 | 2 | 3 | 132 | 133 | 134 | 135 | 136 | 137 | 138 | 139 | 140 | 141 | 142 | 143 | 144 |
| 17 | 18 | 19 | 148 | 149 | 150 | 151 | 152 | 153 | 154 | 155 | 156 | 157 | 158 | 159 | 160 |
| 33 | 34 | 35 | 164 | 165 | 166 | 167 | 168 | 169 | 170 | 171 | 172 | 173 | 174 | 175 | 176 |
| 49 | 50 | 51 | 180 | 181 | 182 | 183 | 184 | 185 | 186 | 187 | 188 | 189 | 190 | 191 | 192 |

| 65 | 66 | 67 | 196 | 197 | 198 | 199 | 200 | 201 | 202 | 203 | 204 | 205 | 206 | 207 | 208 | | | |
|---|---|---|---|---|---|---|---|---|---|---|---|---|---|---|---|---|---|---|
| 81 | 82 | 83 | 212 | 213 | 214 | 215 | 216 | 217 | 218 | 219 | 220 | 221 | 222 | 223 | 224 | | | |
| 97 | 98 | 99 | 228 | 229 | 230 | 231 | 232 | 233 | 234 | 235 | 236 | 237 | 238 | 239 | 240 | | | |
| 113 | 114 | 115 | 244 | 245 | 246 | 247 | 248 | 249 | 250 | 251 | 252 | 253 | 254 | 255 | 256 | | | |
| 129 | 130 | 131 | 4 | 5 | 6 | 7 | 8 | 9 | 10 | 11 | 12 | 13 | 14 | 15 | 16 | | | |
| 145 | 146 | 147 | 20 | 21 | 22 | 23 | 24 | 25 | 26 | 27 | 28 | 29 | 30 | 31 | 32 | | | |
| 161 | 162 | 163 | 36 | 37 | 38 | 39 | 40 | 41 | 42 | 43 | 44 | 45 | 46 | 47 | 48 | | | |
| 177 | 178 | 179 | 52 | 53 | 54 | 55 | 56 | 57 | 58 | 59 | 60 | 61 | 62 | 63 | 64 | | | |
| 193 | 194 | 195 | 68 | 69 | 70 | 71 | 72 | 73 | 74 | 75 | 76 | 77 | 78 | 79 | 80 | | | |
| 209 | 210 | 211 | 84 | 85 | 86 | 87 | 88 | 89 | 90 | 91 | 92 | 93 | 94 | 95 | 96 | | | |
| 225 | 226 | 227 | 100 | 101 | 102 | 103 | 104 | 105 | 106 | 107 | 108 | 109 | 110 | 111 | 112 | | | |
| | | | | | | 241 | 242 | 243 | 116 | 117 | 118 | 119 | 120 | 121 | 122 | 123 | 124 | 125 | 126 | 127 | 128 |
| | | | | | | 1 | 2 | 3 | 132 | 133 | 134 | 135 | 136 | 137 | 138 | 139 | 140 | 141 | 142 | 143 | 144 |
| | | | | | | 17 | 18 | 19 | 148 | 149 | 150 | 151 | 152 | 153 | 154 | 155 | 156 | 157 | 158 | 159 | 160 |
| | | | | | | 33 | 34 | 35 | 164 | 165 | 166 | 167 | 168 | 169 | 170 | 171 | 172 | 173 | 174 | 175 | 176 |
| | | | | | | 49 | 50 | 51 | 180 | 181 | 182 | 183 | 184 | 185 | 186 | 187 | 188 | 189 | 190 | 191 | 192 |

Final Positions (3-4-5-3)

|    | A   | B   | C   | D   | E   | F   | G   | H   | I   | J   | K   | L   | M   | N   | O   | P   |
|----|-----|-----|-----|-----|-----|-----|-----|-----|-----|-----|-----|-----|-----|-----|-----|-----|
| 1  | 196 | 197 | 198 | 199 | 200 | 201 | 202 | 203 | 204 | 205 | 206 | 207 | 208 | 65  | 66  | 67  |
| 2  | 212 | 213 | 214 | 215 | 216 | 217 | 218 | 219 | 220 | 221 | 222 | 223 | 224 | 81  | 82  | 83  |
| 3  | 228 | 229 | 230 | 231 | 232 | 233 | 234 | 235 | 236 | 237 | 238 | 239 | 240 | 97  | 98  | 99  |
| 4  | 244 | 245 | 246 | 247 | 248 | 249 | 250 | 251 | 252 | 253 | 254 | 255 | 256 | 113 | 114 | 115 |
| 5  | 4   | 5   | 6   | 7   | 8   | 9   | 10  | 11  | 12  | 13  | 14  | 15  | 16  | 129 | 130 | 131 |
| 6  | 20  | 21  | 22  | 23  | 24  | 25  | 26  | 27  | 28  | 29  | 30  | 31  | 32  | 145 | 146 | 147 |
| 7  | 36  | 37  | 38  | 39  | 40  | 41  | 42  | 43  | 44  | 45  | 46  | 47  | 48  | 161 | 162 | 163 |
| 8  | 52  | 53  | 54  | 55  | 56  | 57  | 58  | 59  | 60  | 61  | 62  | 63  | 64  | 177 | 178 | 179 |
| 9  | 68  | 69  | 70  | 71  | 72  | 73  | 74  | 75  | 76  | 77  | 78  | 79  | 80  | 193 | 194 | 195 |
| 10 | 84  | 85  | 86  | 87  | 88  | 89  | 90  | 91  | 92  | 93  | 94  | 95  | 96  | 209 | 210 | 211 |
| 11 | 100 | 101 | 102 | 103 | 104 | 105 | 106 | 107 | 108 | 109 | 110 | 111 | 112 | 225 | 226 | 227 |
| 12 | 126 | 127 | 128 | 241 | 242 | 243 | 116 | 117 | 118 | 119 | 120 | 121 | 122 | 123 | 124 | 125 |
| 13 | 142 | 143 | 144 | 1   | 2   | 3   | 132 | 133 | 134 | 135 | 136 | 137 | 138 | 139 | 140 | 141 |
| 14 | 158 | 159 | 160 | 17  | 18  | 19  | 148 | 149 | 150 | 151 | 152 | 153 | 154 | 155 | 156 | 157 |
| 15 | 174 | 175 | 176 | 33  | 34  | 35  | 164 | 165 | 166 | 167 | 168 | 169 | 170 | 171 | 172 | 173 |
| 16 | 190 | 191 | 192 | 49  | 50  | 51  | 180 | 181 | 182 | 183 | 184 | 185 | 186 | 187 | 188 | 189 |

| 1 | 2 | 3 | 4 | 5 | 6 | 7 | 8 |
|---|---|---|---|---|---|---|---|
| 1 | 1 | 0 | 1 | 0 | 1 | 1 | 0 |

| 9 | 10 | 11 | 12 | 13 | 14 | 15 | 16 |
|---|---|---|---|---|---|---|---|
| 1 | 0 | 1 | 0 | 1 | 1 | 0 | 1 |

| 17 | 18 | 19 | 20 | 21 | 22 | 23 | 24 |
|---|---|---|---|---|---|---|---|
| 0 | 0 | 1 | 0 | 0 | 1 | 1 | 1 |

| 25 | 26 | 27 | 28 | 29 | 30 | 31 | 32 |
|---|---|---|---|---|---|---|---|
| 1 | 1 | 0 | 0 | 0 | 0 | 1 | 1 |

| 33 | 34 | 35 | 36 | 37 | 38 | 38 | 40 |
|---|---|---|---|---|---|---|---|
| 0 | 0 | 0 | 0 | 0 | 1 | 0 | 1 |

| 41 | 42 | 43 | 44 | 45 | 46 | 47 | 48 |
|---|---|---|---|---|---|---|---|
| 1 | 1 | 1 | 1 | 1 | 0 | 0 | 1 |

| 49 | 50 | 51 | 52 | 53 | 54 | 55 | 56 |
|---|---|---|---|---|---|---|---|
| 1 | 0 | 0 | 0 | 0 | 0 | 0 | 1 |

| 57 | 58 | 59 | 60 | 61 | 62 | 63 | 64 |
|---|---|---|---|---|---|---|---|
| 0 | 1 | 0 | 0 | 1 | 1 | 1 | 0 |

| 65 | 66 | 67 | 68 | 69 | 70 | 71 | 72 |
|---|---|---|---|---|---|---|---|
| 0 | 0 | 0 | 0 | 1 | 1 | 1 | 1 |

| 73 | 74 | 75 | 76 | 77 | 78 | 79 | 80 |
|---|---|---|---|---|---|---|---|
| 1 | 0 | 1 | 1 | 0 | 1 | 1 | 0 |

| 81 | 82 | 83 | 84 | 85 | 86 | 87 | 88 |
|---|---|---|---|---|---|---|---|
| 1 | 0 | 1 | 1 | 0 | 0 | 0 | 0 |

| 89 | 90 | 91 | 92 | 93 | 94 | 95 | 96 |
|---|---|---|---|---|---|---|---|
| 1 | 0 | 1 | 0 | 0 | 1 | 1 | 1 |

| 97 | 98 | 99 | 100 | 101 | 102 | 103 | 104 |
|---|---|---|---|---|---|---|---|
| 0 | 1 | 1 | 0 | 1 | 1 | 0 | 1 |

| 105 | 106 | 107 | 108 | 109 | 110 | 111 | 112 |
|---|---|---|---|---|---|---|---|
| 0 | 0 | 1 | 0 | 0 | 1 | 1 | 1 |

| 113 | 114 | 115 | 116 | 117 | 118 | 119 | 120 |
|---|---|---|---|---|---|---|---|
| 1 | 0 | 1 | 1 | 1 | 1 | 0 | 1 |

| 121 | 122 | 123 | 124 | 125 | 126 | 127 | 128 |
|---|---|---|---|---|---|---|---|
| 0 | 1 | 1 | 1 | 0 | 0 | 0 | 0 |

FIG. 16A

| 0 | 0 | 0 | 0 | 1 | 1 | 1 | 1 |
| 1 | 0 | 1 | 1 | 0 | 1 | 1 | 0 |
| 1 | 0 | 1 | 1 | 0 | 0 | 0 | 0 |
| 1 | 0 | 1 | 0 | 0 | 1 | 1 | 1 |
| 0 | 1 | 1 | 0 | 1 | 1 | 0 | 1 |
| 0 | 0 | 1 | 0 | 0 | 1 | 1 | 1 |
| 1 | 0 | 1 | 1 | 1 | 1 | 0 | 1 |
| 0 | 1 | 1 | 1 | 0 | 0 | 0 | 0 |

1600c

| 1 | 1 | 0 | 1 | 0 | 1 | 1 | 0 |
|---|---|---|---|---|---|---|---|
| 13 | | | | 6 | | | |

| 1 | 0 | 1 | 0 | 1 | 1 | 0 | 1 |
|---|---|---|---|---|---|---|---|
| 10 | | | | 11 | | | |

| 0 | 0 | 1 | 0 | 0 | 1 | 1 | 1 |
|---|---|---|---|---|---|---|---|
| 2 | | | | 7 | | | |

| 1 | 1 | 0 | 0 | 0 | 0 | 1 | 1 |
|---|---|---|---|---|---|---|---|
| 12 | | | | 3 | | | |

| 0 | 0 | 0 | 0 | 0 | 1 | 0 | 1 |
|---|---|---|---|---|---|---|---|
| 0 | | | | 5 | | | |

| 1 | 1 | 1 | 1 | 1 | 0 | 0 | 1 |
|---|---|---|---|---|---|---|---|
| 15 | | | | 9 | | | |

| 1 | 0 | 0 | 0 | 0 | 0 | 0 | 1 |
|---|---|---|---|---|---|---|---|
| 8 | | | | 1 | | | |

| 0 | 1 | 0 | 0 | 1 | 1 | 1 | 0 |
|---|---|---|---|---|---|---|---|
| 4 | | | | 14 | | | |

| 13 | 6  | 10 | 11 |
|----|----|----|----|
| 2  | 7  | 12 | 3  |
| 0  | 5  | 15 | 9  |
| 8  | 6  | 1  | 14 |
| 0  | 15 | 11 | 6  |
| 11 | 0  | 10 | 7  |
| 6  | 11 | 2  | 7  |
| 11 | 13 | 7  | 0  |

| 13 | 6 | 10 | 11 |
|----|---|----|----|
| 2  | 7 | 12 | 3  |
| 0  | 5 | 15 | 9  |
| 8  | 6 | 1  | 14 |

| 0 | 0 | 0 | 0 | 1 | 1 | 1 | 1 |
|---|---|---|---|---|---|---|---|
| 0 | | | | 15 | | | |

| 1 | 0 | 1 | 1 | 0 | 1 | 1 | 0 |
|---|---|---|---|---|---|---|---|
| 11 | | | | 6 | | | |

| 1 | 0 | 1 | 1 | 0 | 0 | 0 | 0 |
|---|---|---|---|---|---|---|---|
| 11 | | | | 0 | | | |

| 1 | 0 | 1 | 0 | 0 | 1 | 1 | 1 |
|---|---|---|---|---|---|---|---|
| 10 | | | | 7 | | | |

| 0 | 1 | 1 | 0 | 1 | 1 | 0 | 1 |
|---|---|---|---|---|---|---|---|
| 6 | | | | 11 | | | |

| 0 | 0 | 1 | 0 | 0 | 1 | 1 | 1 |
|---|---|---|---|---|---|---|---|
| 2 | | | | 7 | | | |

| 1 | 0 | 1 | 1 | 1 | 1 | 0 | 1 |
|---|---|---|---|---|---|---|---|
| 11 | | | | 13 | | | |

| 0 | 1 | 1 | 1 | 0 | 0 | 0 | 0 |
|---|---|---|---|---|---|---|---|
| 7 | | | | 0 | | | |

| | A | B | C | D | E | F | G | H | I | J | K | L | M | N | O | P |
|---|---|---|---|---|---|---|---|---|---|---|---|---|---|---|---|---|
| 1  | 0 | 1 | 0 | 1 | 0 | 0 | 0 | 1 | 1 | 0 | 1 | 0 | 1 | 0 | 0 | 0 |
| 2  | 1 | 0 | 1 | 0 | 1 | 0 | 0 | 1 | 0 | 1 | 1 | 0 | 1 | 1 | 1 | 1 |
| 3  | 0 | 1 | 0 | 1 | 0 | 0 | 0 | 1 | 1 | 0 | 1 | 0 | 1 | 0 | 0 | 0 |
| 4  | 1 | 0 | 1 | 0 | 1 | 0 | 0 | 1 | 0 | 1 | 1 | 0 | 1 | 1 | 1 | 1 |
| 5  | 0 | 1 | 0 | 1 | 0 | 0 | 0 | 1 | 1 | 0 | 1 | 0 | 1 | 0 | 0 | 0 |
| 6  | 1 | 0 | 1 | 0 | 1 | 0 | 0 | 1 | 0 | 1 | 1 | 0 | 1 | 1 | 1 | 1 |
| 7  | 0 | 1 | 0 | 1 | 0 | 0 | 0 | 1 | 1 | 0 | 1 | 0 | 1 | 0 | 0 | 0 |
| 8  | 1 | 0 | 1 | 0 | 1 | 0 | 0 | 1 | 0 | 1 | 1 | 0 | 1 | 1 | 1 | 1 |
| 9  | 0 | 1 | 0 | 1 | 0 | 0 | 0 | 1 | 1 | 0 | 1 | 0 | 1 | 0 | 0 | 0 |
| 10 | 1 | 0 | 1 | 0 | 1 | 0 | 0 | 1 | 0 | 1 | 1 | 0 | 1 | 1 | 1 | 1 |
| 11 | 0 | 1 | 0 | 1 | 0 | 0 | 0 | 1 | 1 | 0 | 1 | 0 | 1 | 0 | 0 | 0 |
| 12 | 1 | 0 | 1 | 0 | 1 | 0 | 0 | 1 | 0 | 1 | 1 | 0 | 1 | 1 | 1 | 1 |
| 13 | 0 | 1 | 0 | 1 | 0 | 0 | 0 | 1 | 1 | 0 | 1 | 0 | 1 | 0 | 0 | 0 |
| 14 | 1 | 0 | 1 | 0 | 1 | 0 | 0 | 1 | 0 | 1 | 1 | 0 | 1 | 1 | 1 | 1 |
| 15 | 0 | 1 | 0 | 1 | 0 | 0 | 0 | 1 | 1 | 0 | 1 | 0 | 1 | 0 | 0 | 0 |
| 16 | 1 | 0 | 1 | 0 | 1 | 0 | 0 | 1 | 0 | 1 | 1 | 0 | 1 | 1 | 1 | 1 |

FIG. 18

|    | A | B | C | D | E | F | G | H | I | J | K | L | M | N | O | P |
|----|---|---|---|---|---|---|---|---|---|---|---|---|---|---|---|---|
| 1  | 1 | 1 | 1 | 0 | 1 | 0 | 0 | 1 | 0 | 1 | 0 | 1 | 1 | 0 | 1 | 0 |
| 2  | 1 | 0 | 1 | 1 | 0 | 1 | 1 | 0 | 1 | 1 | 0 | 1 | 0 | 1 | 1 | 0 |
| 3  | 0 | 0 | 1 | 0 | 1 | 0 | 0 | 0 | 1 | 0 | 1 | 1 | 1 | 1 | 0 | 0 |
| 4  | 0 | 1 | 0 | 0 | 1 | 0 | 1 | 0 | 0 | 1 | 0 | 0 | 0 | 0 | 1 | 0 |
| 5  | 1 | 0 | 1 | 0 | 0 | 1 | 1 | 0 | 0 | 1 | 0 | 0 | 1 | 0 | 1 | 0 |
| 6  | 0 | 1 | 0 | 0 | 1 | 0 | 0 | 1 | 1 | 0 | 0 | 1 | 0 | 0 | 1 | 1 |
| 7  | 1 | 1 | 1 | 1 | 0 | 0 | 0 | 1 | 1 | 0 | 1 | 0 | 0 | 0 | 1 | 0 |
| 8  | 0 | 0 | 1 | 1 | 1 | 1 | 0 | 0 | 0 | 0 | 1 | 0 | 1 | 0 | 1 | 0 |
| 9  | 0 | 0 | 0 | 0 | 1 | 1 | 0 | 1 | 1 | 0 | 0 | 1 | 1 | 0 | 0 | 1 |
| 10 | 0 | 0 | 1 | 0 | 0 | 1 | 0 | 1 | 0 | 0 | 0 | 1 | 0 | 0 | 1 | 0 |
| 11 | 0 | 1 | 0 | 0 | 1 | 0 | 1 | 0 | 0 | 0 | 1 | 1 | 0 | 1 | 1 | 0 |
| 12 | 1 | 0 | 0 | 1 | 0 | 0 | 0 | 0 | 1 | 0 | 0 | 1 | 0 | 1 | 0 | 0 |
| 13 | 0 | 1 | 0 | 1 | 0 | 1 | 0 | 1 | 0 | 0 | 1 | 0 | 1 | 0 | 1 | 1 |
| 14 | 1 | 1 | 1 | 0 | 1 | 1 | 0 | 0 | 0 | 1 | 0 | 0 | 0 | 1 | 0 | 1 |
| 15 | 0 | 0 | 1 | 0 | 0 | 1 | 0 | 1 | 0 | 1 | 0 | 1 | 0 | 0 | 1 | 0 |
| 16 | 1 | 0 | 0 | 1 | 0 | 0 | 0 | 1 | 1 | 0 | 1 | 1 | 0 | 0 | 1 | 0 |

FIG. 19

|    | A | B | C | D | E | F | G | H | I | J | K | L | M | N | O | P |
|----|---|---|---|---|---|---|---|---|---|---|---|---|---|---|---|---|
| 1  | 1 | 0 | 1 | 0 | 1 | 0 | 0 | 1 | 0 | 1 | 0 | 1 | 1 | 1 | 0 | 1 |
| 2  | 0 | 1 | 1 | 0 | 0 | 0 | 1 | 0 | 0 | 0 | 1 | 0 | 1 | 0 | 1 | 0 |
| 3  | 0 | 0 | 1 | 0 | 1 | 0 | 1 | 0 | 1 | 0 | 0 | 1 | 0 | 1 | 1 | 1 |
| 4  | 1 | 0 | 0 | 0 | 1 | 1 | 0 | 1 | 1 | 0 | 0 | 1 | 0 | 0 | 0 | 1 |
| 5  | 0 | 1 | 0 | 0 | 1 | 0 | 1 | 0 | 1 | 1 | 0 | 1 | 0 | 0 | 0 | 0 |
| 6  | 1 | 0 | 1 | 1 | 0 | 1 | 1 | 0 | 1 | 0 | 1 | 1 | 0 | 0 | 0 | 1 |
| 7  | 0 | 1 | 0 | 0 | 0 | 1 | 0 | 1 | 1 | 1 | 1 | 0 | 0 | 0 | 1 | 0 |
| 8  | 0 | 1 | 0 | 1 | 0 | 0 | 1 | 0 | 0 | 0 | 0 | 1 | 0 | 1 | 0 | 0 |
| 9  | 0 | 0 | 1 | 1 | 0 | 0 | 1 | 0 | 0 | 1 | 0 | 1 | 0 | 0 | 1 | 0 |
| 10 | 0 | 1 | 0 | 0 | 1 | 1 | 0 | 0 | 1 | 0 | 0 | 1 | 1 | 1 | 1 | 1 |
| 11 | 1 | 0 | 0 | 0 | 1 | 1 | 0 | 1 | 0 | 0 | 0 | 1 | 0 | 0 | 0 | 1 |
| 12 | 0 | 1 | 0 | 1 | 0 | 0 | 1 | 1 | 1 | 0 | 0 | 0 | 0 | 1 | 0 | 1 |
| 13 | 0 | 0 | 1 | 1 | 1 | 1 | 0 | 1 | 1 | 0 | 1 | 1 | 0 | 0 | 1 | 1 |
| 14 | 0 | 1 | 0 | 1 | 0 | 1 | 0 | 0 | 1 | 0 | 1 | 0 | 0 | 0 | 1 | 0 |
| 15 | 1 | 1 | 0 | 0 | 0 | 1 | 0 | 1 | 0 | 1 | 0 | 0 | 0 | 1 | 0 | 0 |
| 16 | 1 | 0 | 0 | 0 | 1 | 0 | 1 | 0 | 0 | 0 | 0 | 1 | 0 | 0 | 1 | 0 |

FIG. 20

|    | A | B | C | D | E | F | G | H | I | J | K | L | M | N | O | P |
|----|---|---|---|---|---|---|---|---|---|---|---|---|---|---|---|---|
| 1  | 1 | 0 | 1 | 0 | 0 | 1 | 1 | 1 | 1 | 1 | 1 | 0 | 1 | 1 | 1 | 1 |
| 2  | 0 | 0 | 1 | 0 | 0 | 0 | 1 | 1 | 1 | 1 | 1 | 1 | 1 | 1 | 0 | 1 |
| 3  | 0 | 0 | 1 | 1 | 1 | 0 | 0 | 1 | 0 | 0 | 0 | 0 | 0 | 1 | 0 | 0 |
| 4  | 1 | 1 | 0 | 1 | 1 | 1 | 0 | 0 | 0 | 1 | 0 | 1 | 0 | 0 | 0 | 1 |
| 5  | 0 | 1 | 0 | 0 | 0 | 1 | 1 | 0 | 1 | 0 | 0 | 0 | 1 | 0 | 0 | 0 |
| 6  | 1 | 0 | 0 | 0 | 0 | 0 | 1 | 1 | 1 | 0 | 0 | 0 | 1 | 1 | 0 | 0 |
| 7  | 1 | 0 | 0 | 0 | 0 | 0 | 0 | 1 | 1 | 0 | 1 | 1 | 0 | 0 | 0 | 0 |
| 8  | 1 | 1 | 1 | 0 | 0 | 1 | 0 | 0 | 1 | 0 | 0 | 0 | 1 | 1 | 0 | 0 |
| 9  | 0 | 0 | 0 | 0 | 0 | 0 | 1 | 1 | 0 | 0 | 1 | 0 | 1 | 0 | 0 | 1 |
| 10 | 1 | 1 | 0 | 1 | 1 | 1 | 1 | 0 | 0 | 0 | 1 | 1 | 0 | 0 | 1 | 1 |
| 11 | 0 | 1 | 1 | 1 | 1 | 1 | 0 | 0 | 1 | 0 | 1 | 0 | 0 | 0 | 0 | 1 |
| 12 | 1 | 0 | 0 | 1 | 1 | 0 | 0 | 0 | 0 | 0 | 1 | 0 | 1 | 1 | 1 | 0 |
| 13 | 0 | 0 | 1 | 0 | 0 | 1 | 1 | 0 | 1 | 0 | 0 | 1 | 0 | 0 | 0 | 1 |
| 14 | 1 | 0 | 1 | 1 | 1 | 1 | 1 | 0 | 0 | 1 | 1 | 1 | 0 | 0 | 1 | 0 |
| 15 | 1 | 0 | 1 | 0 | 0 | 0 | 0 | 1 | 0 | 1 | 0 | 0 | 1 | 0 | 0 | 0 |
| 16 | 1 | 0 | 0 | 0 | 0 | 1 | 0 | 0 | 1 | 0 | 0 | 1 | 0 | 0 | 0 | 0 |

|    | A | B | C | D | E | F | G | H | I | J | K | L | M | N | O | P |
|----|---|---|---|---|---|---|---|---|---|---|---|---|---|---|---|---|
| 1  | 1 | 1 | 1 | 1 | 0 | 1 | 1 | 0 | 0 | 1 | 0 | 0 | 0 | 1 | 1 | 1 |
| 2  | 1 | 0 | 0 | 0 | 1 | 0 | 1 | 0 | 1 | 0 | 0 | 1 | 0 | 0 | 1 | 0 |
| 3  | 0 | 1 | 1 | 0 | 1 | 0 | 0 | 0 | 1 | 0 | 1 | 0 | 1 | 1 | 0 | 0 |
| 4  | 0 | 1 | 1 | 1 | 0 | 1 | 0 | 1 | 0 | 0 | 1 | 1 | 1 | 1 | 1 | 0 |
| 5  | 0 | 0 | 0 | 1 | 0 | 1 | 1 | 1 | 0 | 0 | 1 | 0 | 0 | 0 | 0 | 0 |
| 6  | 0 | 0 | 1 | 0 | 1 | 0 | 1 | 0 | 1 | 1 | 1 | 0 | 0 | 0 | 1 | 1 |
| 7  | 1 | 1 | 0 | 1 | 0 | 0 | 0 | 0 | 0 | 0 | 0 | 1 | 1 | 0 | 0 | 0 |
| 8  | 0 | 1 | 0 | 0 | 1 | 1 | 0 | 1 | 1 | 1 | 1 | 0 | 0 | 0 | 1 | 1 |
| 9  | 0 | 1 | 0 | 1 | 0 | 0 | 1 | 0 | 1 | 0 | 0 | 0 | 0 | 0 | 0 | 1 |
| 10 | 0 | 1 | 1 | 1 | 0 | 1 | 1 | 1 | 0 | 1 | 0 | 1 | 1 | 1 | 0 | 0 |
| 11 | 0 | 0 | 1 | 0 | 1 | 1 | 0 | 1 | 0 | 0 | 0 | 0 | 1 | 0 | 0 | 1 |
| 12 | 0 | 0 | 1 | 1 | 0 | 0 | 0 | 1 | 0 | 1 | 0 | 0 | 0 | 0 | 0 | 1 |
| 13 | 0 | 1 | 1 | 1 | 0 | 1 | 1 | 1 | 0 | 0 | 1 | 1 | 1 | 0 | 0 | 1 |
| 14 | 0 | 0 | 0 | 1 | 0 | 1 | 1 | 1 | 0 | 0 | 0 | 1 | 1 | 1 | 0 | 1 |
| 15 | 1 | 1 | 1 | 1 | 0 | 0 | 0 | 0 | 1 | 1 | 1 | 0 | 0 | 0 | 0 | 0 |
| 16 | 0 | 0 | 1 | 0 | 1 | 1 | 0 | 1 | 1 | 1 | 1 | 1 | 1 | 1 | 1 | 1 |

FIG. 22

METHODS AND SYSTEMS FOR ENCRYPTING DATA USING OBJECT-BASED SCREENS

CROSS-REFERENCE TO RELATED APPLICATIONS

This application claims priority to and is a continuation of U.S. patent application Ser. No. 16/153,917, filed on Oct. 8, 2018, which claims priority to and is a continuation-in-part of U.S. patent application Ser. No. 15/728,058, filed on Oct. 9, 2017, both of which are incorporated herein by reference in their entireties.

STATEMENT REGARDING FEDERALLY SPONSORED RESEARCH OR DEVELOPMENT

Not applicable.

BACKGROUND OF THE INVENTION

1. Field of the Invention

The present invention relates generally to data security and, more specifically, to methods and systems for encrypting data using object-based screens while allowing for the encrypted data to remain accessible to the appropriate users and systems.

2. Description of Related Art

The need for robust, flexible tools for encrypting and securing data is well-known. Organizations and individual users seek methods and systems to provide encryption and data security at varying levels of granularity, while allowing the data to remain easily accessible to the appropriate users. Several independent factors have driven the need for such encryption methods and data security.

For example, the sheer volume and accessibility of data has risen rapidly in recent years. Driven in large part by a sharp decline in the cost of data storage and a simultaneous increase in the quality and volume of data storage, the difficulty of creating large data repositories has been made trivial. Further, organizations and individual users increasingly look to electronic data as a primary source of information—rather than tangible documents such as paper—because of the persistence, availability, searchability, and accessibility of electronic data. Additionally, robust networking and communications technologies have made data accessible to user devices in a variety of contexts, including when a user device establishes a remote connection to a primary network that hosts the accessed data. Finally, business and legal requirements demand the retention and general availability of historic data for at least several years. In sum, vast quantities of data are constantly created and persisted, and organizations and individual users have expectations of the ability to access such data.

However, organizations and individual users have significant actual and perceived risk from data breaches caused by unauthorized users. Well-known breaches from outside intruders have resulted in significant operational and financial impact to many organizations, governments, and individual users. Further, users are frequently at risk of breaches of their personal and business information. Additionally, in large organizations, groups may seek to limit access to data based on user and role. While access control programs and methods exist to mitigate improper access, the wide variety of methods of data access make it nearly impossible to prevent at least some users from accessing data that they should not have access to. For example, even crucial data is routinely saved on network storage, on local devices, on remote storage devices outside a network, and on removable storage devices such as universal serial bus (USB) drives. Because data—including mission critical data—is often resident in multiple locations with varying degrees of security, there is a persistent risk of improper data access. There are no generally available techniques of ensuring that data stored by users on disparate media will be secured using a repeated framework. Further, users face business and legal requirements to ensure that their data is secured in the face of these risks.

Another complication is the demand that data remain readily accessible to users, applications, and databases. Organizations and individual users want to have data secured and contained, while also available broadly to appropriate users in a variety of contexts. Thus, effective solutions must be scalable and efficient to meet these requirements.

Conventional methods and systems have failed to address these problems. Some known techniques involve masking, distorting or otherwise obfuscating some or all of a data set when data is stored in certain contexts so as to make some or all of the stored data unreadable by certain viewers. However, these techniques lack meaningful protection to secure the entirety of the underlying data. In many cases, and particularly in the context of source code storage, it is possible to reverse-engineer the obfuscated data. Further, when obfuscation techniques are potent, it is typically time consuming to de-obfuscate the data for presentation to appropriate users. Other known techniques involve the use of secret keys to encrypt data, wherein the secret key is issued using a master key. While these techniques successfully encrypt data, they lack the ability to efficiently provide robust encryption at multiple levels such as the user, device, application, and organization levels.

BRIEF SUMMARY OF THE INVENTION

The present invention is directed to a method and system for encrypting data using object-based wave screens (and optionally stumbling blocks and/or XOR blocks), while allowing for the encrypted data to remain accessible to appropriate users and systems. The invention improves the functionality of computer systems by providing robust, scalable security solutions that improve the protection of data and the accessibility of that data. Also, the invention provides a unique solution to the problem of data security that is rooted in computer technology by storing or transporting the data within data maps that have been encrypted with object-based wave screens (and optionally stumbling blocks and/or XOR blocks) and enabling access to the data by decrypting the data maps with additional object-based wave screens (and optionally additional stumbling blocks and/or XOR blocks).

In one aspect, the present invention is directed to a computing device and method for encrypting a plurality of data files for secure storage or transport. The computing device is used to generate a wave screen that is used for encryption of all of the data files, wherein the wave screen is associated with a block map layout. The computing device is also used to generate a plurality of stumbling blocks each of which is used for encryption of one of the data files, wherein each of the stumbling blocks is associated with the block map layout. The computing device is additionally used to encrypt each of the data files by: (a) identifying a plurality of data segments to be encrypted, wherein each of the data segments comprises a plurality of bits within the data file; (b) positioning the bits of each of the data segments within the block map layout to generate a data map for each of the data segments; and (c) encrypting each of the data maps by (i) applying the stumbling block generated for encryption of the data file to remap the positions of the bits within the block map layout and (ii) applying the wave screen to remap the positions of the bits within the block map layout. The computing device is further used to store or transport the encrypted data maps as a representation of each of the data files.

In another aspect, the present invention is directed to a computing device and method for encrypting data for secure storage or transport. The computing device is used to generate a wave screen associated with a block map layout by: (a) generating a set of wave screen production instructions in which a plurality of binary values are paired with a plurality of integers to create a set of binary value/integer pairs, wherein the binary value of each of the binary value/integer pairs indicates a direction of bit movement within the block map layout and the integer of each of the binary value/integer pairs indicates an offset of bit movement within the block map layout; and (b) generating the wave screen based on the set of wave screen production instructions, wherein the wave screen comprises a set of remapping instructions that identifies a correspondence between a plurality of initial bit positions and a plurality of remapped bit positions within the block map layout. The computing device is also used to encrypt the data by: (a) identifying a plurality of data segments to be encrypted, wherein each of the data segments comprises a plurality of bits within the data; (b) positioning the bits of each of the data segments within the block map layout to generate a data map for each of the data segments; and (c) encrypting each of the data maps by applying the wave screen to remap the positions of the bits within the block map layout. The computing device is further used to store or transport the encrypted data maps as a representation of the data.

In yet another aspect, the present invention is directed to a computing device and method for encrypting data for secure storage or transport. The computing device is used to generate a first wave screen associated with a block map layout by: (a) identifying a first set of identity-based objects; and (b) using the first set of identity-based objects to generate the first wave screen, wherein the first wave screen comprises a first set of remapping instructions that identifies a correspondence between a plurality of initial bit positions and a plurality of remapped bit positions within the block map layout. The computing device is also used to generate a second wave screen associated with the block map layout by: (a) identifying a second set of identity-based objects; and (b) using the second set of identity-based objects to generate the second wave screen, wherein the second wave screen comprises a second set of remapping instructions that identifies a correspondence between a plurality of initial bit positions and a plurality of remapped bit positions within the block map layout. The computing device is additionally used to encrypt the data by: (a) identifying a plurality of data segments to be encrypted, wherein each of the data segments comprises a plurality of bits within the data; (b) positioning the bits of each of the data segments within the block map layout to generate a data map for each of the data segments; and (c) encrypting each of the data maps by (i) applying the first wave screen to remap the positions of the bits within the block map layout in accordance with the first set of remapping instructions and (ii) applying the second wave screen to remap the positions of the bits within the block map layout in accordance with the second set of remapping instructions. The computing device is further used to store or transport the encrypted data maps as a representation of the data.

BRIEF DESCRIPTION OF THE DRAWINGS

Various exemplary embodiments of the present invention are described in detail below with reference to the attached drawing figures, wherein:

FIG. 1 depicts an exemplary block map layout;

FIG. 2 depicts an exemplary first object comprising a string of binary values;

FIG. 3 depicts an exemplary data mask that is generated based on the binary values of the first object of FIG. 2;

FIG. 5 depicts an exemplary set of wave screen production instructions that are generated based on an interaction between the binary values of the first object of FIG. 2 and the integers of the second object of FIG. 4;

FIGS. 6A-6D depict an exemplary wave screen comprising a set of remapping instructions provided in a table format, which are generated based on the wave screen production instructions of FIG. 5 in combination with the data mask of FIG. 3;

FIG. 7 depicts an exemplary wave screen comprising a set of remapping instructions provided in a block map format, which are generated based on the wave screen production instructions of FIG. 5 in combination with the data mask of FIG. 3;

FIGS. 8A-8E depict the generation of a first exemplary stumbling block based on a first exemplary stumbling signature;

FIGS. 9A-9E depict the generation of a second exemplary stumbling block based on a second exemplary stumbling signature;

FIGS. 10A-10E depict the generation of a third exemplary stumbling block based on a third exemplary stumbling signature;

FIGS. 16A-16C depict an exemplary set of binary values from which first and second objects are derived;

FIGS. 17A-17C depict an exemplary set of integers from which first and second objects are derived;

FIG. 18 depicts an exemplary XOR block that is generated based on the binary values of the first object of FIG. 2;

FIG. 19 depicts an exemplary data block to be encrypted;

FIG. 20 depicts an encrypted data block that is generated by applying the stumbling block of FIG. 10E to the data block of FIG. 19;

FIG. 21 depicts an encrypted data block that is generated by applying the wave screen of FIG. 7 to the encrypted data block of FIG. 20; and FIG. 22 depicts an encrypted data block that is generated by applying the XOR block of FIG. 18 to the encrypted data block of FIG. 21.

DETAILED DESCRIPTION OF EXEMPLARY EMBODIMENTS

Figure 4:
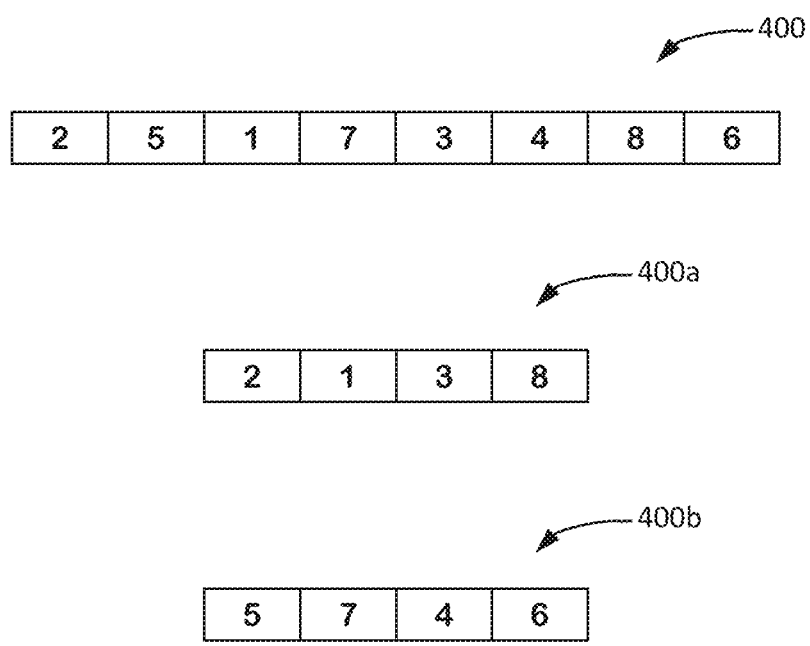
FIG. 4 depicts an exemplary second object comprising a string of integers.

The present invention is directed to a method and system for encrypting data using object-based wave screens (and optionally stumbling blocks and/or XOR blocks), while allowing for the encrypted data to remain accessible to appropriate users and systems. While the invention will be described in detail below with reference to various exemplary embodiments, it should be understood that the invention is not limited to the specific configurations or methodologies of these embodiments. In addition, although the exemplary embodiments are described as embodying several different inventive features, one skilled in the art will appreciate that any one of these features could be implemented without the others in accordance with the present invention.

As described below, the present invention is implemented on a computing device configured to encrypt data using object-based wave screens, stumbling blocks and/or XOR blocks. One or more of the encryption screens/blocks may be generated based on a predetermined event, such as when a user logs into the computing device or when a user enters a username/password to activate the computing device (wherein the one or more encryption screens/blocks may be deleted when the computing device locks). Thus, the one or more encryption screens/blocks are available for use in connection with the encryption of all data stored by the computing device and/or all data transported as "in flight" data to another computing device. One or more of the encryption screens/blocks may also be generated each time data is to be encrypted for storage and/or transport. Of course, other triggering events for generation of the encryption screens/blocks will be apparent to one skilled in the art.

In one embodiment, only a wave screen is used to encrypt data. In this case, the wave screen is generated based on a predetermined event and is available for use in connection with the encryption of all data stored by the computing device and/or all data transported as "in flight" data to another computing device.

In another embodiment, a wave screen and a stumbling block are used to encrypt data. In this case, the wave screen is generated based on a predetermined event and is available for use in connection with the encryption of all data stored by the computing device and/or all data transported as "in flight" data to another computing device. In contrast, the stumbling block is generated on demand when particular data is to be encrypted for storage and/or transport. Thus, the stumbling block used to encrypt certain data may be different than the stumbling block used to encrypt other data (although the same wave screen is used to encrypt all of the data).

In another embodiment, a wave screen and an XOR block are used to encrypt data. In this case, the wave screen and the XOR block are generated based on a predetermined event and are available for use in connection with the encryption of all data stored by the computing device and/or all data transported as "in flight" data to another computing device.

In yet another embodiment, a wave screen, a stumbling block, and an XOR block are all used to encrypt data. In this case, the wave screen and the XOR block are generated based on a predetermined event and are available for use in connection with the encryption of all data stored by the computing device and/or all data transported as "in flight" data to another computing device. In contrast, the stumbling block is generated on demand when particular data is to be encrypted for storage and/or transport. Thus, the stumbling block used to encrypt certain data may be different than the stumbling block used to encrypt other data (although the same wave screen and XOR block are used to encrypt all of the data).

Of course, other embodiments will be apparent to one skilled in the art in which data is encrypted using wave screens in combination with stumbling blocks, XOR blocks and/or other types of encryption blocks.

The computing device is also configured to identify data to be encrypted. For example, data may be identified for encryption if the data is being stored (locally or remotely) in a context that requires encryption or transported in a context that requires encryption. The context that requires encryption may be based, for example, on a policy associated with one or more of the computing device, a user, an organization, a network, a software application, or any other attributes.

The computing device is additionally configured to divide the identified data into multiple data segments based upon a selected block size. It can be appreciated that the number of data segments is based on the size of the identified data and the selected block size. For example, if the computing device identifies a file of 5 megabytes for encryption and the selected block size is 64 kilobytes, the computing device will divide the file into 79 data segments for encryption. The block size is dependent on a selected block map layout (such as the exemplary block map layout shown in FIG. 1) associated with the wave screens, stumbling blocks and/or XOR blocks used to encrypt the data segments, as will be described in greater detail below. Exemplary block sizes are 32 bits, 64 bits, 128 bits, 256 bits, 512 bits, 1,024 bits, 2,048 bits, 4,096 bits, 8,192 bits, 16,384 bits, 32,768 bits, 65,536 bits or greater. Of course, other block sizes may also be used within the scope of the present invention.

The computing device is further configured to encrypt the identified data by applying the wave screens to each of the data segments. Any number of wave screens may be applied to the data segments (e.g., 1, 2, 3, 4 or more wave screens) so as to provide a single layer of encryption or multiple layers of encryption. Optionally, the data segments may further be encrypted by applying one or more stumbling blocks and/or XOR blocks. It should be understood that the wave screens, stumbling blocks and/or XOR blocks used to encrypt the data segments may be applied in any order in accordance with the present invention. Further, it should be understood that the encrypted data segments may be decrypted by applying decryption wave screens, stumbling blocks and/or XOR blocks to allow authorized users to access the data segments, as described in greater detail below.

Provided below is a detailed description of the generation of wave screens (Section 1), the generation of stumbling blocks (Section 2), and the generation of XOR blocks (Section 3), as well as the encryption and decryption of data segments using wave screens, stumbling blocks, and XOR blocks (Section 4). Also provided below is a detailed description of exemplary computing devices and systems that may be used to encrypt and decrypt data segments to enable the secure storage and transport of data in accordance with the present invention (Section 5).

1. Generation of Object-Based Wave Screens
   a. Identification of Objects

Each wave screen is generated based on a plurality of objects, including a first object and a second object. As used herein, the term "object" refers to a set of values used in generating a wave screen. Examples of objects include a string of binary values, a string of integers, or any other set of values that enable the generation of a wave screen in accordance with the present invention. In some embodiments, the objects used to generate a wave screen are independent objects (such as those shown in FIGS. 2 and 4, described below). In other embodiments, the objects are derived from a single set of values. For example, in one embodiment, a single set of binary values is used to provide the objects (such as those shown in FIGS. 16A-16C, described below). In another embodiment, a single set of integers is used to provide the objects (such as those shown in FIGS. 17A-17C, described below). Thus, the term "objects" as used herein refers to either independent objects or a single set of values from which objects may be derived. Of course, other types of objects may also be used in accordance with the present invention.

In an exemplary embodiment, the first object comprises a string of binary values having a string length x so as to provide $2^x$ possible combinations of binary values for the first object. FIG. 2 shows an example of a first object 200 having a string length of 64 binary values. In other examples, the first object may have a string length of a multiple of 64 binary values, such as 128 or 256 binary values. Of course, the first object may have other string lengths in accordance with the present invention.

In this embodiment, the second object comprises a string of integers having a string length y. The integers range from 1 to y and each integer is used only once within the string (i.e., the integers are not repeated). As such, there are y-factorial (or y!) possible combinations of integers for the second object. FIG. 4 shows an example of a second object 400 that, for simplicity, is shown in abbreviated form to have a string length of 8 integers. It should be noted that a more typical string length would be 64 integers or a multiple thereof. Of course, the second object may have other string lengths in accordance with the present invention. In addition, in other embodiments, the second object could use one or more integers that are repeated and/or could use non-sequential integers.

In the example shown in FIG. 4, it can be seen that the odd numbered elements of second object 400 are identified as reference number 400a, and the even numbered elements of second object 400 are identified as reference number 400b. In the exemplary embodiment, it will be seen that the wave screen is created, in part, based on the use of odd numbered elements 400a to denote horizontal movement of bits within the block map layout and the use of even numbered elements 400b to denote vertical movement of bits within the block map layout, as described below.

Preferably, the objects used to generate the wave screen provide identity-based encryption and decryption. For example, the objects may be associated with an identity of a computing device, a user identity, an organizational identity, a network identity, a biometric signature, a software application, a timestamp, a geographic location, or any other attributes. It can be appreciated that two or more sets of objects may be used to generate two or more wave screens and provide multiple layers of encryption and decryption, as described in greater detail below.

In some embodiments, the objects are assigned by an organization, software manufacturer, network authority, or other third party. For example, the information technology (IT) department of an organization could maintain a collection of objects and assign objects to each employee when issuing a computing device for use at the organization. As another example, a software manufacturer could provide the objects associated with the operating system (OS) installed on a computing device, wherein the computing device may not be used without the objects. As yet another example, a network authority could manage the assignment of objects used in a transport level of encryption. In other embodiments, the objects are derived from an identifier using any suitable method including, but not limited to, pre-defined algorithms, hash tables, arrays, look up tables, or databases using unique keys. For example, the objects could be derived from the serial number of a computing device or any other unique or non-unique identifier.

In some embodiments, the objects are assigned based on the context of a data storage or transport event. For example, the objects could be assigned based on the identity of a user associated with the event, the identity of an organization associated with the event, the identity of a network associated with the event, a software application associated with the event, the time associated with the event, or the geographic location of the computing device associated with the event.

The objects used to generate the wave screens could be stored on the computing device used to store and/or transport the data. However, in preferred embodiments, the objects are stored on a storage device separate from the computing device. In one example, the objects are stored on a mobile phone that communicates with the computing device using Bluetooth low-energy (BLE), near-field communication (NFC), or similar wireless technologies. In another example, the objects are stored on a removable storage device, such as a Universal Serial Bus (USB) drive that is connectable to a USB port of the computing device. In yet another example, the objects are stored on a smart card, chip card, integrated circuit chip (ICC) card or other secured token. Alternatively, the objects may be stored on a remote storage device in networked communication with the computing device. Preferably, objects should only be transmitted over a network if they cannot be readily used to generate a wave screen that enables the decryption of data. For example, the objects could be delivered within an additionally encrypted session or in an otherwise secure fashion. In all of these examples, the computing device identifies the objects by retrieving them from the applicable storage device. It can be appreciated that an unauthorized user would not be able to access encrypted data stored on the computing device because such user would not have access to the objects required to decrypt the data. Thus, the storage of objects on a separate storage device is preferred to the storage of objects on the computing device itself.

It should be understood that the invention is not limited to the objects used to generate the wave screen of the exemplary embodiment (i.e., the first and second objects shown in FIGS. 2 and 4, respectively) and that other types of objects may also be used.

For example, in some embodiments, the first and second objects are derived from a single set of binary values. FIG. 16A shows an example set of binary values 1600a that includes various binary values located in bit positions 1-128, as shown, and from which the first and second objects may be derived. It should be noted that the set of binary values 1600a may be randomly generated, mechanically generated, or otherwise generated using any methods known in the art.

Figure 16B:
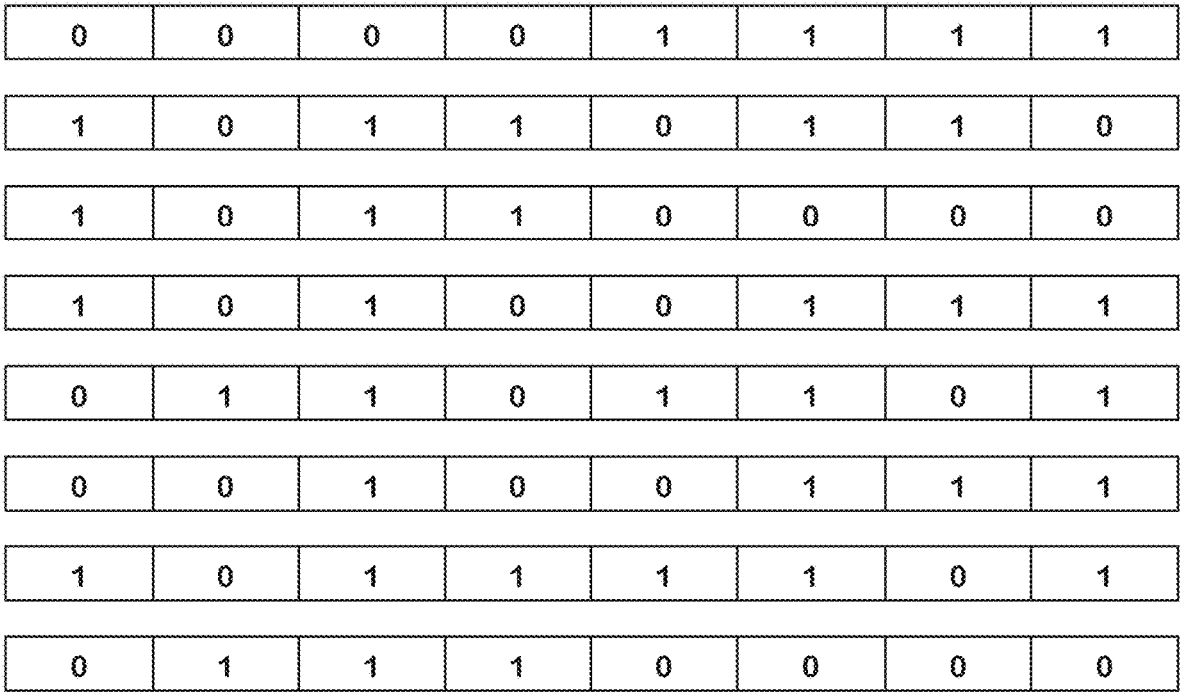

FIG. 16B shows a first object 1600b comprised of the binary values in bit positions 65-128 of the set of binary values 1600a shown in FIG. 16A. Thus, first object 1600b comprises a string of 64 binary values. Of course, the first object may have other string lengths in accordance with the present invention. For example, the first object could comprise all or any portion of the binary bits included in the set of binary values 1600a shown in FIG. 16A.

FIG. 16C shows a second object 1600c comprised of integers derived from the binary values in bit positions 1-64 of the set of binary values 1600a shown in FIG. 16A. In this embodiment, the integers are derived from the binary values using a binary-to-decimal conversion. For example, binary values 1101 are converted to integer 13, binary values 0110 are converted to integer 6, binary values 1010 are converted to integer 10, binary values 1101 are converted to integer 11, etc. Thus, second object 1600c comprises a string of 16 integers (0 to 15) and each integer is used only once within the string (i.e., the integers are not repeated). Of course, the second object may include one or more integers that are repeated and/or could use non-sequential integers. In addition, the second object may have other string lengths in accordance with the present invention. For example, the second object could comprise integers that are derived from all or any portion of the binary bits included in the set of binary values 1600a shown in FIG. 16A.

In other embodiments, the first and second objects are derived from a single set of integers. FIG. 17A shows an example set of integers 1700a that includes 32 integers, as shown, and from which the first and second objects may be derived. It should be noted that the set of integers 1700a may be randomly generated, mechanically generated, or otherwise generated using any methods known in the art.

FIG. 17B shows a first object 1700b comprised of the first half of integers of the set of integers 1700a shown in FIG. 17A. Thus, first object 1700b comprises a string of 16 integers between 0 and 15, wherein the integer 4 is not used at all and the integer 6 is used twice. Of course, the first object may include sequential integers that are not repeated. In addition, the first object may have other string lengths in accordance with the present invention. For example, the first object could comprise all or any portion of the integers included in the set of integers 1700a shown in FIG. 17A.

FIG. 17C shows a second object 1700c comprised of binary values derived from the second half of integers of the set of integers 1700a shown in FIG. 17A. In this embodiment, the binary values are derived from the integers using a decimal-to-binary conversion. For example, the integer 0 is converted to binary values 0000, the integer 6 is converted to binary values 0110, the integer 10 is converted to binary values 1010, the integer 11 is converted to binary values 0101, etc. Thus, second object 1700c comprises a string of 64 binary values. Of course, the second object may have other string lengths in accordance with the present invention. For example, the second object could comprise binary values that are derived from all or any portion of the integers included in the set of integers 1700a shown in FIG. 17A.

b. Generation of Wave Screens

The objects described above are processed to generate a wave screen—either an encryption wave screen used to encrypt each data segment (described below) or a decryption wave screen used to decrypt a previously-encrypted data segment. As used herein, the term "wave screen" refers to a set of remapping instructions associated with a block map layout that may be applied to encrypt or decrypt a data segment. The term "block map layout" refers to a virtual structure that identifies a plurality of bit positions arranged in a predetermined manner. The virtual structure may comprise a one-dimensional array (i.e., a linear array of data), a two-dimensional array (i.e., data arranged in rows and columns), a three-dimensional array (i.e., an array of two-dimensional arrays), or any other type of data structure known in the art. As will be seen, the set of remapping instructions associated with the block map layout identifies a correspondence between a plurality of initial (original) bit positions and a plurality of remapped (final) bit positions within the block map layout.

In an exemplary embodiment, the bit positions of the block map layout are arranged in a table having a plurality of rows and columns (i.e., a two-dimensional array). The block map layout may be formatted as a square having a row/column ratio of 1:1, as a rectangle having a row/column ratio of 2:1, or in any other ratio or format suitable for implementing the present invention. FIG. 1 shows an example of a block map layout 100 formatted as a square and having 16 rows (rows 1-16) and 16 columns (columns A-P) to provide 256 bit positions, as shown. As such, this block map layout may be used to store 256 bits of data. In other examples, the number of rows/columns in the block map layout may be 8×4 (which can store 32 bits of data), 8×8 (which can store 64 bits of data), 16×8 (which can store 128 bits of data), 16×16 (which can store 256 bits of data), 32×16 (which can store 512 bits of data), 32×32 (which can store 1,024 bits of data), 64×32 (which can store 2,048 bits of data), 64×64 (which can store 4,096 bits of data), 128×64 (which can store 8,192 bits of data), 128×128 (which can store 16,384 bits of data), 256×128 (which can store 32,768 bits of data), and 256×256 (which can store 65,536 bits of data). Of course, other block map layouts may also be used within the scope of the present invention.

As mentioned above, the wave screen comprises a set of remapping instructions that identifies a correspondence between a plurality of initial bit positions and a plurality of remapped bit positions within the block map layout. In an exemplary embodiment, the initial bit positions are transposed to the remapped bit positions in accordance with the following steps: (1) generate a data mask defined by the binary values of the first object, as described below in connection with FIG. 3; (2) generate a set of wave screen production instructions based on an interaction between the binary values of the first object and the integers of the second object, as described below in connection with FIG. 5; and then (3) apply the set of wave screen production instructions in conjunction with the data mask to generate the wave screen, as described below in connection with FIGS. 6A-6D and FIG. 7. Each of these steps will now be described in greater detail.

First, in the exemplary embodiment, a data mask is generated based on the binary values of the first object. FIG. 3 shows an example of a data mask 300 that is generated by striping the binary values of the first object 200 shown in FIG. 2 across the block map layout 100 shown in FIG. 1. In this example, the block map layout 100 may be used to store 256 bits of data (i.e., a 16×16 map) and the first object 200 includes 64 binary values. As such, the data mask 300 represents the 64 binary values of the first object 200 striped four times across the block map layout 100. In the data mask 300, the striped binary values are referred to as "mask bits." In other examples, the striping may optionally begin with an offset that is determined, for example, based on the sum of the binary values of the first object. Of course, it should be understood that the invention is not limited to the use of the data mask 300 shown in FIG. 3 and that other data masks may also be used that are based on other block map layouts and/or first objects that have different sizes or formats.

Second, in the exemplary embodiment, a set of wave screen production instructions are generated based on an interaction between the binary values of the first object and the integers of the second object. The wave screen production instructions may be provided in a variety of different formats. FIG. 5 shows an example of a set of wave screen production instructions 500 provided in a table format, which is generated based on an interaction between the binary values of the first object 200 shown in FIG. 2 and the integers of the second object 400 shown in FIG. 4.

In this example, the set of wave screen production instructions 500 is generated by successively pairing each sequential binary value of the first object 200 with each sequential integer of the second object 400. The string length of the first object 200 (64 binary values) is greater than the string length of the second object 400 (8 integers). Thus, the integers in the second object 400 are repeated eight times to obtain a pairing for each binary value in the first object 200. Specifically, the 8 integers in the second object 400 are successively paired with the binary values in elements 1-8, elements 9-16, elements 17-24, elements 25-32, elements 33-40, elements 41-48, elements 49-56, and elements 57-64 of the first object 200, as shown. Of course, it should be understood that this same approach may be used in connection with any objects having different string lengths, including those in which the string length of the second object is greater than the string length of the first object.

Further, other pairing techniques may be used that do not involve successive pairing of the elements in the first and second objects. As an example, a pairing technique may be used in which every other group of elements in an object requires a reverse pairing of the corresponding elements in the other object. For example, the integers of the second object 400 could be paired in reverse order with elements 9-16, elements 25-32, elements 41-48, and elements 57-64 of the first object 200. One skilled in the art will appreciate that a variety of other pairing schemes may also be used within the scope of the present invention.

Referring still to FIG. 5, it can be seen that each of the integers of the second object 400 are associated with a directional designation, i.e., left, right, up, or down. As discussed above in connection with FIG. 4, the odd numbered elements 400a of the second object 400 denote horizontal movement of bits (either left or right) within the block map layout, and the even numbered elements 400b of the second object 400 denote vertical movement of bits (either up or down) within the block map layout. The binary value of the first object 200 determines whether the directional designation is left or right (for the odd numbered elements 400a of the second object 400) or up or down (for the even numbered elements 400b of the second object 400). In this example, a binary value of zero (0) within the first object 200 indicates movement of bits right or up within the block map layout, and a binary value of one (1) within the first object 200 indicates movement of bits left or down within the block map layout.

Thus, the set of wave screen production instructions provides the initial remapping instructions for each of the bits in the data segment in terms of horizontal and vertical movement. For a given bit, the set of wave screen production instructions indicates a direction of movement based on the associated binary value from the first object, as well as an offset based on the associated integer from the second object. For example, the set of wave screen production instructions 500 shown in FIG. 5 indicate that the bit in the first bit position of the block map layout should move right 2 positions and down 5 positions, the bit in the second bit position of the block map layout should move right 1 position and down 7 positions, the bit in the third bit position of the block map layout should move right 3 positions and up 4 positions, etc.

If the movement required by the wave screen production instructions would cause a bit to move past any of the outer boundary edges of the block map layout, a resolution instruction may be applied that requires the bit to wrap around to the opposite end of the applicable row or column in order to complete the required movement. For example, the set of wave screen production instructions 500 shown in FIG. 5 indicate that the bit in the third bit position of the block map layout should move right 3 positions and up 4 positions. The third bit position is located at column C, row 1. Thus, while a bit can move right 3 positions to the bit position located at column F, row 1, it cannot move up 4 positions without moving past the upper boundary edge of the block map layout. In this case, the "upward" movement will cause the bit to move to the bottom end of column F and then up 4 positions to the bit position located at column F, row 13. One skilled in the art will appreciate that a variety of other resolution schemes may also be used within the scope of the present invention.

Third, in the exemplary embodiment, the set of wave screen production instructions is applied in conjunction with the data mask to generate a wave screen. The wave screen may be provided in a variety of different formats. FIGS. 6A-6D show an example of a wave screen in which the remapping instructions are provided in a table format (see tables 600a-600d). FIG. 7 shows an example of a wave screen in which the same remapping instructions are provided in a block map format. In both examples, the remapping instructions are generated based on the wave screen production instructions 500 shown in FIG. 5 and the data mask 300 shown in FIG. 3, as described below.

In this example, the wave screen is generated by applying the wave screen production instructions 500 that provide the initial remapping instructions (as described above) and then applying the data mask 300 to further remap certain bits in the data segment. In this example, the mask bits in the data mask 300 are used to determine if such further remapping is required. Specifically, a mask bit of zero (0) in a bit position indicates that no further remapping is required for a bit landing in that bit position after application of the wave screen production instructions 500. However, a mask bit of one (1) in a bit position indicates that further remapping is required for a bit landing in that bit position after application of the wave screen production instructions 500. The further remapping requires movement of the bit from the landing position to the next available bit position, which may be any bit position identified by a pre-defined horizontal or vertical movement from the landing bit position. In this example, the next available bit position is defined as the bit position immediately to the right of the landing bit position (even if that next available bit position contains a mask bit of one (1)). The mask bit in the landing position is then changed to a mask bit of zero (0).

For example, the set of wave screen production instructions 500 shown in FIG. 5 indicate that the bit in the first bit position of the block map layout should move right 2 positions and down 5 positions, i.e., from the bit position located at column A, row 1 to the bit position located at column C, row 6. However, the mask bit located at column C, row 6 is a one (1). Thus, the bit must move 1 position to the right to the bit position located at column D, row 6. The mask bit located at column D, row 6 is a zero (0). Therefore, no further remapping is required. As such, the remapping instructions would require movement of a bit from the initial bit position of column A, row 1 to a remapped bit position of column D, row 6. These remapping instructions can be seen in the wave screen shown in FIG. 6A. This same information can be seen in the wave screen shown in FIG. 7, wherein the initial bit position of "1" located at column A, row 1 is shown in the remapped bit position of column D, row 6.

If the movement required by the further remapping would cause a bit to move past the right boundary edge of the block map layout (i.e., to the right of column P), a resolution instruction may be applied that requires the bit to move to the first bit position of the next row in the block map layout (i.e., typewriter rules). For example, the set of wave screen production instructions 500 shown in FIG. 5 indicate that the bit in the nineteenth bit position of the block map layout should move left 3 positions and up 4 positions, i.e., from the bit position located at column C, row 2 to the bit position located at column P, row 14 (using the boundary edge resolution rules described above). However, the mask bit located at column P, row 14 is a one (1). Thus, the bit must move 1 position to the right. Because the bit cannot move 1 position to the right without moving past the right boundary edge of the block map layout, the bit will move to the first bit position of the next row, i.e., the bit position located at column A, row 15. The mask bit located at column A, row 15 is a zero (0). Therefore, no further remapping is required. As such, the remapping instructions would require movement of a bit from the initial bit position of column C, row 2 to a remapped bit position of column A, row 15. These remapping instructions can be seen in the wave screen shown in FIG. 6A. This same information can be seen in the wave screen shown in FIG. 7, wherein the initial bit position of "19" located at column C, row 2 is shown in the remapped bit position of column A, row 15. One skilled in the art will appreciate that a variety of other resolution schemes may also be used within the scope of the present invention.

It should be noted that the resolution scheme described above may also be used when application of the wave screen production instructions 500 and data mask 300 would cause a bit to land in a bit position that already contains another bit.

While the wave screen of the exemplary embodiment is generated by applying a set of wave screen productions instructions in conjunction with a data mask to provide the remapping instructions, it should be understood that the invention is not limited to this method of generating a wave screen. For example, a wave screen may be generated that is based solely on a set of wave screen production instructions (i.e., a data mask would not be applied). In this case, the set of wave screen production instructions would function as the remapping instructions. Of course, one skilled in the art will understand that other methods of generating a wave screen may be used in accordance with the present invention.

2. Generation of Stumbling Blocks

Stumbling blocks may optionally be used in addition to the object-based wave screens described above to further encrypt data prior to storage or transport and preclude a user from accessing encrypted data without the proper authorization. As used herein, the term "stumbling block" refers to a set of remapping instructions associated with a block map layout (such as the exemplary block map layout shown in FIG. 1) that may be applied to encrypt or decrypt a data segment. As will be seen, this set of remapping instructions identifies a correspondence between a plurality of initial (original) bit positions and a plurality of remapped (final) bit positions within the block map layout. In this regard, a stumbling block is similar to a wave screen. However, a stumbling block is generated in a different way than a wave screen.

Each stumbling block is generated based on a stumbling signature (rather than objects). Preferably, the stumbling signature is generated on demand as data is to be stored or transported. In the exemplary embodiment, the stumbling signatures are disposable and single use so that each successive storage or transport of data would apply a new stumbling signature. The stumbling signatures would typically be used at the file level (i.e., a single stumbling signature would be used for all of the data segments within a given file). For example, if the computing device identifies a file of 5 megabytes for encryption and the selected block size is 64 kilobytes, the computing device will divide the file into 79 data segments and the same stumbling signature will be used to encrypt each of the 79 data segments. Of course, in other embodiments, the stumbling signature may be used at the block level rather than the file level.

In an exemplary embodiment, the stumbling signature comprises a set of four integers each of which identifies a specific "slicing" or "shifting" function to be used in generating the stumbling block. A first integer identifies a number of vertical columns to be "sliced" from a block map, and a second integer identifies a degree of "shift" for the sliced columns and resultant block map. Similarly, a third integer identifies a number of horizontal rows to be "sliced" from a block map, and a fourth integer identifies a degree of "shift" for the sliced rows and resultant block map. Resolution instructions may also be used to relocate bit positions, rows or columns that extend beyond the edge boundaries of a block map. Various examples of stumbling signatures and resolution instructions will now be provided to illustrate the generation of stumbling blocks in accordance with the present invention.

Figure 8A:
Figure 8A:

FIGS. 8A-8E illustrate the generation of a first exemplary stumbling block based on a first exemplary stumbling signature 800. As shown in FIG. 8A, the stumbling signature 800 comprises four integers (i.e., 1-1-1-1). The first integer indicates a vertical slice of 1 column, and the second integer indicates a vertical shift of 1 unit associated with the vertical slice. Similarly, the third integer indicates a horizontal slice of 1 row, and the fourth integer indicates a horizontal shift of 1 unit associated with the horizontal slice. A set of remapping instructions defined by the stumbling signature 800 is applied to a block map 800*a* having initial bit positions (see FIG. 8A) to generate a stumbling block having remapped bit positions (see FIG. 8E), as will be described below.

First, the left-most column (i.e., a vertical slice of 1 column) is sliced from block map 800*a* and shifted upward 1 unit while the remainder of block map 800*a* is shifted downward 1 unit (i.e., a vertical shift of 1 unit). The resultant block map 800*b* is shown in FIG. 8B. Next, the top left bit position that extends beyond the top edge boundary of block map 800*b* is selected and moved to the bottom left bit position, and the bottom row that extends beyond the bottom edge boundary of block map 800*b* is selected and moved to the top row. The resultant block map 800*c* is shown in FIG. 8C.

Next, the bottom row (i.e., a horizontal slice of 1 row) is sliced from block map 800*c* and shifted right 1 unit while the remainder of block map 800*c* is shifted left 1 unit (i.e., a horizontal shift of 1 unit). The resultant block map 800*d* is shown in FIG. 8D. Finally, the bottom right bit position that extends beyond the right edge boundary of block map 800*d* is selected and moved to the bottom left bit position, and the left-most column that extends beyond the left edge boundary of block map 800d is selected and moved to the right-most column. The resultant block map 800e is shown in FIG. 8E.

Figure 8E:
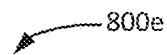

It can be seen that block map 800e shown in FIG. 8E identifies a correspondence between the initial bit positions and the remapped bit positions (similar to the wave screen shown in FIG. 7). For example, the initial bit position of "1" located at column A, row 1 is shown in the remapped bit position of column B, row 16. Thus, block map 800e may be used as a stumbling block to encrypt a data segment in accordance with the present invention.

FIGS. 9A-9E illustrate the generation of a second exemplary stumbling block based on a second exemplary stumbling signature 900. As shown in FIG. 9A, the stumbling signature 900 comprises four integers (i.e., 2-3-2-2). The first integer indicates a vertical slice of 2 columns, and the second integer indicates a vertical shift of 3 units associated with the vertical slice. Similarly, the third integer indicates a horizontal slice of 2 rows, and the fourth integer indicates a horizontal shift of 2 units associated with the horizontal slice. A set of remapping instructions defined by the stumbling signature 900 is applied to a block map 900a having initial bit positions (see FIG. 9A) to generate a stumbling block having remapped bit positions (see FIG. 9E), as will be described below.

First, the 2 left-most columns (i.e., a vertical slice of 2 columns) are sliced from block map 900a and shifted upward 3 units while the remainder of block map 900a is shifted downward 3 units (i.e., a vertical shift of 3 units). The resultant block map 900b is shown in FIG. 9B. Next, the top left bit positions that extend beyond the top edge boundary of block map 900b are selected and moved to the bottom left bit positions, and the bottom rows that extend beyond the bottom edge boundary of block map 900b are selected and moved to the top rows. The resultant block map 900c is shown in FIG. 9C.

Next, the 2 bottom rows (i.e., a horizontal slice of 2 rows) are sliced from block map 900c and shifted right 2 units while the remainder of block map 900c is shifted left 2 units (i.e., a horizontal shift of 2 units). The resultant block map 900d is shown in FIG. 9D. Finally, the bottom right bit positions that extend beyond the right edge boundary of block map 900d are selected and moved to the bottom left bit positions, and the left-most columns that extend beyond the left edge boundary of block map 900d are selected and moved to the right-most columns. The resultant block map 900e is shown in FIG. 9E.

It can be seen that block map 900e shown in FIG. 9E identifies a correspondence between the initial bit positions and the remapped bit positions (similar to the wave screen shown in FIG. 7). For example, the initial bit position of "1" located at column A, row 1 is shown in the remapped bit position of column O, row 14. Thus, block map 900e may be used as a stumbling block to encrypt a data segment in accordance with the present invention.

Figure 10B:
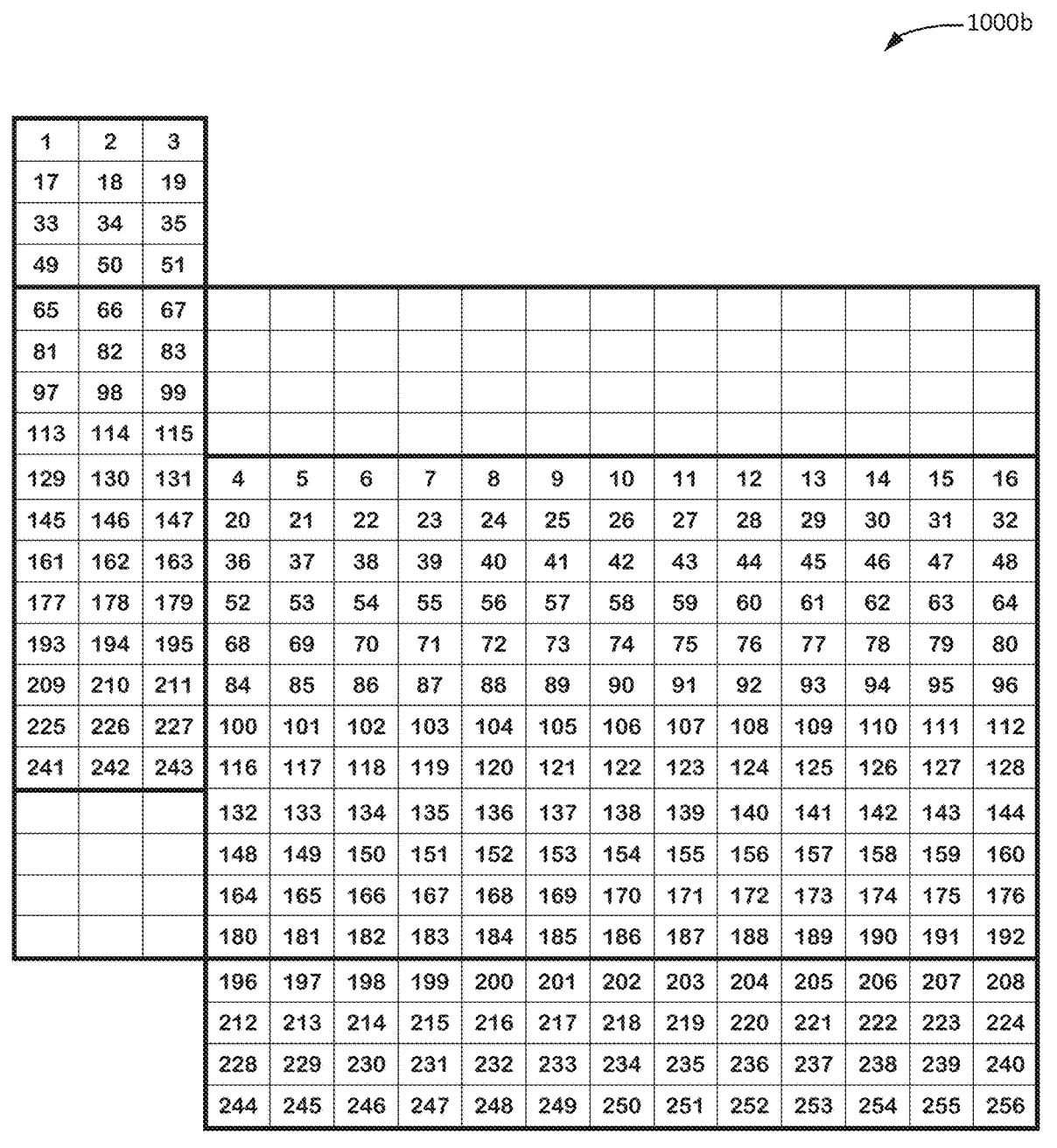

FIGS. 10A-10E illustrate the generation of a third exemplary stumbling block based on a third exemplary stumbling signature 1000. As shown in FIG. 10A, the stumbling signature 1000 comprises four integers (i.e., 3-4-5-3). The first integer indicates a vertical slice of 3 columns, and the second integer indicates a vertical shift of 4 units associated with the vertical slice. Similarly, the third integer indicates a horizontal slice of 5 rows, and the fourth integer indicates a horizontal shift of 3 units associated with the horizontal slice. A set of remapping instructions defined by the stumbling signature 1000 is applied to a block map 1000a having initial bit positions (see FIG. 10A) to generate a stumbling block having remapped bit positions (see FIG. 10E), as will be described below.

First, the 3 left-most columns (i.e., a vertical slice of 3 columns) are sliced from block map 1000a and shifted upward 4 units while the remainder of block map 1000a is shifted downward 4 units (i.e., a vertical shift of 4 units). The resultant block map 1000b is shown in FIG. 10B. Next, the top left bit positions that extend beyond the top edge boundary of block map 1000b are selected and moved to the bottom left bit positions, and the bottom rows that extend beyond the bottom edge boundary of block map 1000b are selected and moved to the top rows. The resultant block map 1000c is shown in FIG. 10C.

Next, the 5 bottom rows (i.e., a horizontal slice of 5 rows) are sliced from block map 1000c and shifted right 3 units while the remainder of block map 1000c is shifted left 3 three units (i.e., a horizontal shift of 3 units). The resultant block map 1000d is shown in FIG. 10D. Finally, the bottom right bit positions that extend beyond the right edge boundary of block map 1000d are selected and moved to the bottom left bit positions, and the left-most columns that extend beyond the left edge boundary of block map 1000d are selected and moved to the right-most columns. The resultant block map 1000e is shown in FIG. 10E.

It can be seen that block map 1000e shown in FIG. 10E identifies a correspondence between the initial bit positions and the remapped bit positions (similar to the wave screen shown in FIG. 7). For example, the initial bit position of "1" located at column A, row 1 is shown in the remapped bit position of column D, row 13. Thus, block map 1000e may be used as a stumbling block to encrypt a data segment in accordance with the present invention.

3. Generation of XOR Blocks

XOR (exclusive or) blocks may optionally be used in addition to the object-based wave screens described above (and optionally the stumbling blocks described above) to further encrypt data prior to storage or transport and preclude a user from accessing encrypted data without the proper authorization. As is known in the art, an "exclusive or" is a logical operation in which the output is true only when the inputs are different. When this logical operation is applied in the context of binary values, the inputs and associated outputs are shown in Table 1 below:

TABLE 1

| Input 1 | Input 2 | Output |
|---------|---------|--------|
| 0 | 0 | 0 |
| 1 | 1 | 0 |
| 0 | 1 | 1 |
| 1 | 0 | 1 |

In the exemplary embodiment, each XOR block is generated based on all or a portion of the binary values in one of the objects used to generate a wave screen, as discussed above. FIG. 18 shows an example XOR block 1800 that is generated by striping the binary values in bit positions 1-32 of the first object 200 shown in FIG. 2 across the block map layout 100 shown in FIG. 1. In this example, the block map layout 100 may be used to store 256 bits of data (i.e., a 16×16 map). As such, the XOR block 1800 represents the binary values in bit positions 1-32 of the first object 200 striped eight times across the block map layout 100. In other examples, the striping may optionally begin with an offset that is determined, for example, based on the sum of the binary values of the first object. Of course, all or any portion of the 64 binary values of the first object 200 may be used to generate the XOR block 1800. Further, it should be understood that the invention is not limited to the use of the XOR block 1800 shown in FIG. 18 and that other XOR blocks may also be used that are based on other block map layouts and/or first objects that have different sizes or formats.

4. Encryption and Decryption of Data Segments

For each data segment identified for encryption, the bits of the data segment are positioned within a block map layout to generate a data map. As used herein, the term "data map" refers to the bits of a data segment positioned in accordance within a block map layout. For example, if the block map layout 100 shown in FIG. 1 is used for encryption, then a data segment having 256 bits of data is projected into the 256 bit positions of block map layout 100 to generate the data map. The data map is then encrypted by applying one or more wave screens and optionally one or more stumbling blocks and/or one or more XOR blocks.

In one embodiment, the data map is encrypted by applying one or more wave screens (each of which is generated from wave screen production instructions and optionally a data mask) to remap the positions of the bits in accordance with the set of remapping instructions of each wave screen. Specifically, each of the bits is moved from its initial bit position in the data map to its remapped bit position in the data map as defined by the set of remapping instructions of the wave screen.

In another embodiment, the data map is encrypted by applying one or more wave screens (each of which is generated from wave screen production instructions and optionally a data mask) to remap the positions of the bits in accordance with the set of remapping instructions of each wave screen. Specifically, each of the bits is moved from its initial bit position in the data map to its remapped bit position in the data map as defined by the set of remapping instructions of the wave screen. The data map is also encrypted by applying one or more stumbling blocks to remap the positions of the bits in accordance with the set of remapping instructions of each stumbling block. Specifically, each of the bits is moved from its initial bit position in the data map to its remapped bit position in the data map as defined by the set of remapping instructions of the stumbling block. The wave screen(s) and stumbling block(s) may be applied in any order in accordance with the present invention.

In another embodiment, the data map is encrypted by applying one or more wave screens (each of which is generated from wave screen production instructions and optionally a data mask) to remap the positions of the bits in accordance with the set of remapping instructions of each wave screen. Specifically, each of the bits is moved from its initial bit position in the data map to its remapped bit position in the data map as defined by the set of remapping instructions of the wave screen. The data map is also encrypted by applying one or more XOR blocks to modify the bits in the data map. The wave screen(s) and XOR block(s) may be applied in any order in accordance with the present invention.

In yet another embodiment, the data map is encrypted by applying one or more wave screens (each of which is generated from wave screen production instructions and optionally a data mask) to remap the positions of the bits in accordance with the set of remapping instructions of each wave screen. Specifically, each of the bits is moved from its initial bit position in the data map to its remapped bit position in the data map as defined by the set of remapping instructions of the wave screen. The data map is also encrypted by applying one or more stumbling blocks to remap the positions of the bits in accordance with the set of remapping instructions of each stumbling block. Specifically, each of the bits is moved from its initial bit position in the data map to its remapped bit position in the data map as defined by the set of remapping instructions of the stumbling block. The data map is additionally encrypted by applying one or more XOR blocks to modify the bits in the data map. The wave screen(s), stumbling block(s) and XOR block(s) may be applied in any order in accordance with the present invention. An example of this embodiment will be described with reference to FIGS. 19-22.

FIG. 19 show an original data map prior to any encryption. FIG. 20 shows a "first" encrypted data map that has been generated by applying the stumbling block shown in FIG. 10E (i.e., the stumbling block based on the stumbling signature 3-4-5-3) to the original data map shown in FIG. 19. FIG. 21 shows a "second" encrypted data map that has been generated by applying the wave screen shown in FIG. 7 (i.e., the wave screen based on the first and second objects shown in FIGS. 2 and 4, respectively) to the "first" encrypted data map shown in FIG. 20. Finally, FIG. 22 shows a "third" encrypted data map that has been generated by applying the XOR block shown in FIG. 18 to the "second" encrypted data map shown in FIG. 21. Thus, the data in the original data map is indecipherable when encrypted as the "third" encrypted data map.

Because each data map is encrypted with the wave screen(s) and optionally the stumbling block(s) and/or XOR block(s) described above, a computing device may decrypt the data map only if that computing device has access to the object pair(s) and/or stumbling signature(s) used for encryption. When such object pair(s) and/or stumbling signature(s) are available, the computing device reverses the process described above to restore the encrypted data to its initial form. Thus, the present invention provides a robust mechanism for encrypting data for secure storage or transport and allowing the secure accessibility of that data.

In preferred embodiments, any stumbling block(s) used for encryption are applied prior to the wave screen(s). By applying the stumbling block(s) prior to the wave screen(s), the stumbling signature(s) associated with the stumbling block(s) may be stored or transported along with the encrypted data map. An authorized computing device that has access to the object pair(s) is able to decrypt the data map using the object pair(s) (i.e., the first decryption step(s)) and then further decrypt the data map using the stumbling signature(s) provided with the encrypted data map (i.e., the second decryption step(s)). However, an unauthorized computing device that does not have access to the object pair(s) cannot perform the first decryption step and, thus, the stumbling signature(s) provided with the encrypted data map are of no value and cannot be used to perform the second decryption step without initially performing the first decryption step. Of course, the present invention is not limited to this order of encryption and the wave screen(s), stumbling block(s) and/or XOR block(s) used to encrypt each data map may be applied in any order in accordance with the present invention.

5. Computing Devices and Systems

Figure 11:
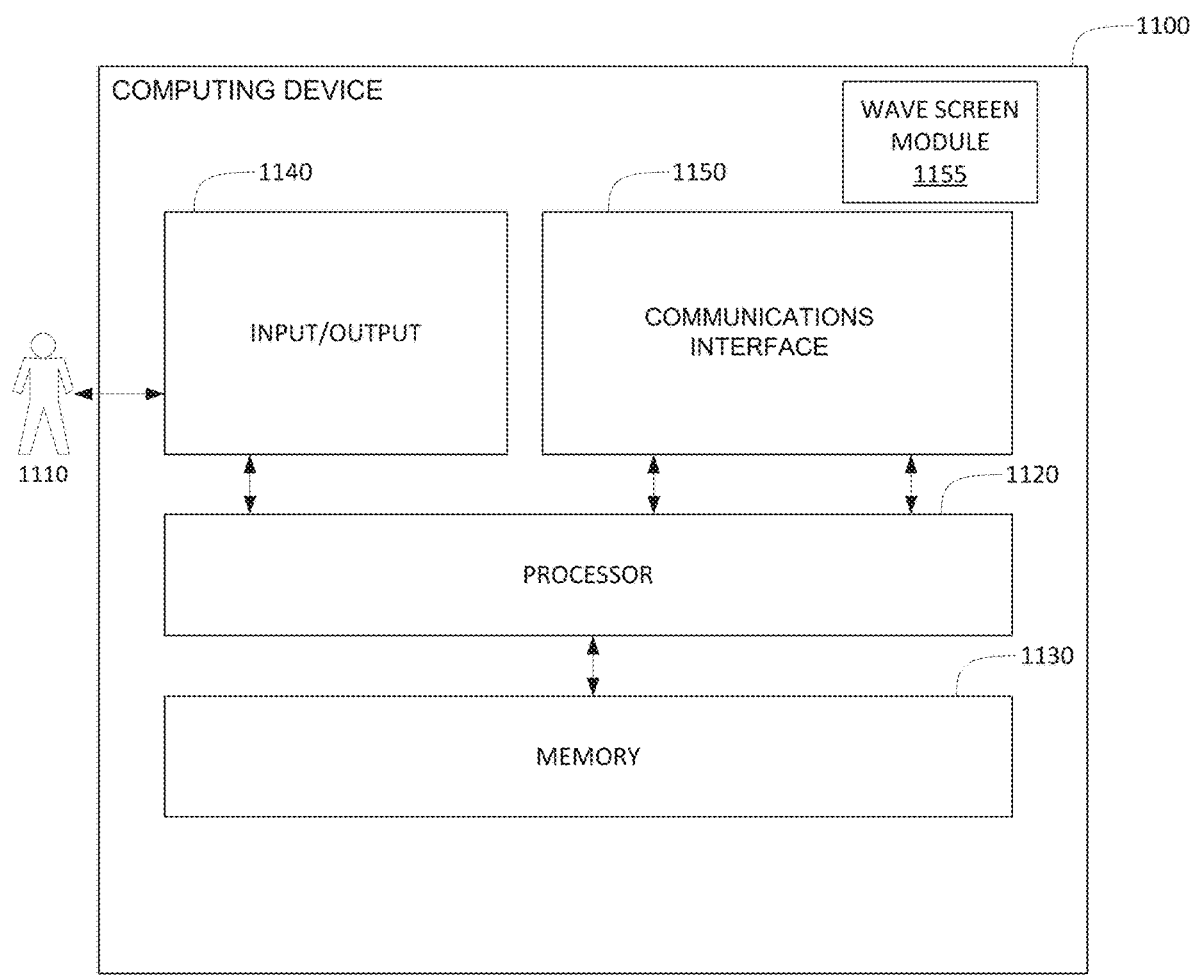
FIG. 11 is a block diagram of an exemplary computing device that enables the encryption of data for storage or transport.

FIG. 11 illustrates an exemplary computing device 1100 that enables the encryption of data for storage or transport in accordance with the present invention. Computing device 1100 may comprise any type of computing device capable of performing the functions described herein, including, but not limited to, desktop computing devices, laptop computing devices, computing peripheral devices, smart phones, wearable computing devices, medical computing devices, tablet computing devices, mobile computing devices, vehicular computing devices, and the like. While exemplary components of computing device 1100 will be described below, it should be understood that other components with characteristics that are more or less advanced or functional than those of the described components may alternatively be used in accordance with the present invention.

In the exemplary configuration shown in FIG. 11, computing device 1100 is operated by a user 1110 and generally includes the following components: a processor 1120, a memory area 1130, an input/output unit 1140, a communications interface 1150, and a wave screen module 1155. Of course, other components may also be provided depending on the configuration of the computing device. Each of the components shown in FIG. 11 will be described below.

Processor 1120 is configured to execute instructions stored in memory area 1130 and functions to control input/output unit 1140 and communications interface 1150. The processor may comprise central processing units, microprocessors, microcontrollers, reduced instruction set circuits (RISC), application specific integrated circuits (ASIC), logic circuits, and any other circuit or processor capable of executing the functions described herein. Processor 1120 may also include one or more processing units, for example, a multi-core configuration. Memory area 1130 may comprise any type of memory that allows data and executable instructions to be stored and retrieved, such as a flash memory drive, digital versatile disc (DVD), compact disc (CD), fixed (hard) drive, diskette, optical disk, magnetic tape, or semiconductor memory such as read-only memory (ROM). The encrypted data maps generated in accordance with the present invention may be stored in memory area 1130 in any format, including structured formats (e.g., structured files or databases) or unstructured formats.

Preferably, data passing from processor 1120 to memory area 1130 is encrypted via the application of one or more encryption wave screens and optionally one or more encryption stumbling blocks and/or encryption XOR blocks and, conversely, encrypted data passing from memory area 1130 to processor 1120 is decrypted via the applications of one or more decryption wave screens and optionally one or more decryption stumbling blocks and/or decryption XOR blocks. The data may be encrypted and decrypted at the file system layer so that the wave screens, stumbling blocks and/or XOR blocks are applied to all reads and writes to the file system. Alternatively, the encryption and decryption may operate below the file system layer using, for example, a volume manager.

Input/output unit 1140 is configured to receive information from and provide information to user 1110. In some examples, input/output unit 1140 may include an output adapter such as a video adapter and/or an audio adapter. Input/output unit 1140 may alternatively include an output device such as a display device, a liquid crystal display (LCD), an organic light emitting diode (OLED) display, an "electronic ink" display, and/or an audio output device such as a speaker or headphones. Input/output unit 1140 may also include any device, module, or structure for receiving input from user 1110, including, but not limited to, a keyboard, a pointing device, a mouse, a stylus, a touch sensitive panel, a touch pad, a touch screen, a gyroscope, an accelerometer, a position detector, or an audio input device. A single component such as a touch screen may function as both an output device and an input device. Input/output unit 1140 may further include multiple sub-components for carrying out the input and output functions. In other examples, input/output unit 1140 may be of limited functionality or non-functional as in the case of some wearable computing devices.

Communication interface 1150 is configured to enable communication with a remote device, such as a remote server, a remote computing device, or any other suitable system. Communication interface 1150 may include, for example, a wired or wireless network adapter or a wireless data transceiver for use with a mobile data network or Worldwide Interoperability for Microwave Access (WiMAX).

Wave screen module 1155 is configured to enable the encryption, decryption, and data security functions described herein. Specifically, wave screen module 1155 includes instructions that are executed by processor 1120 to generate the encryption and decryption wave screens, stumbling blocks and/or XOR blocks and then apply those wave screens, stumbling blocks and/or XOR blocks to encrypt and decrypt a plurality of data maps, as described generally above.

Figure 12:
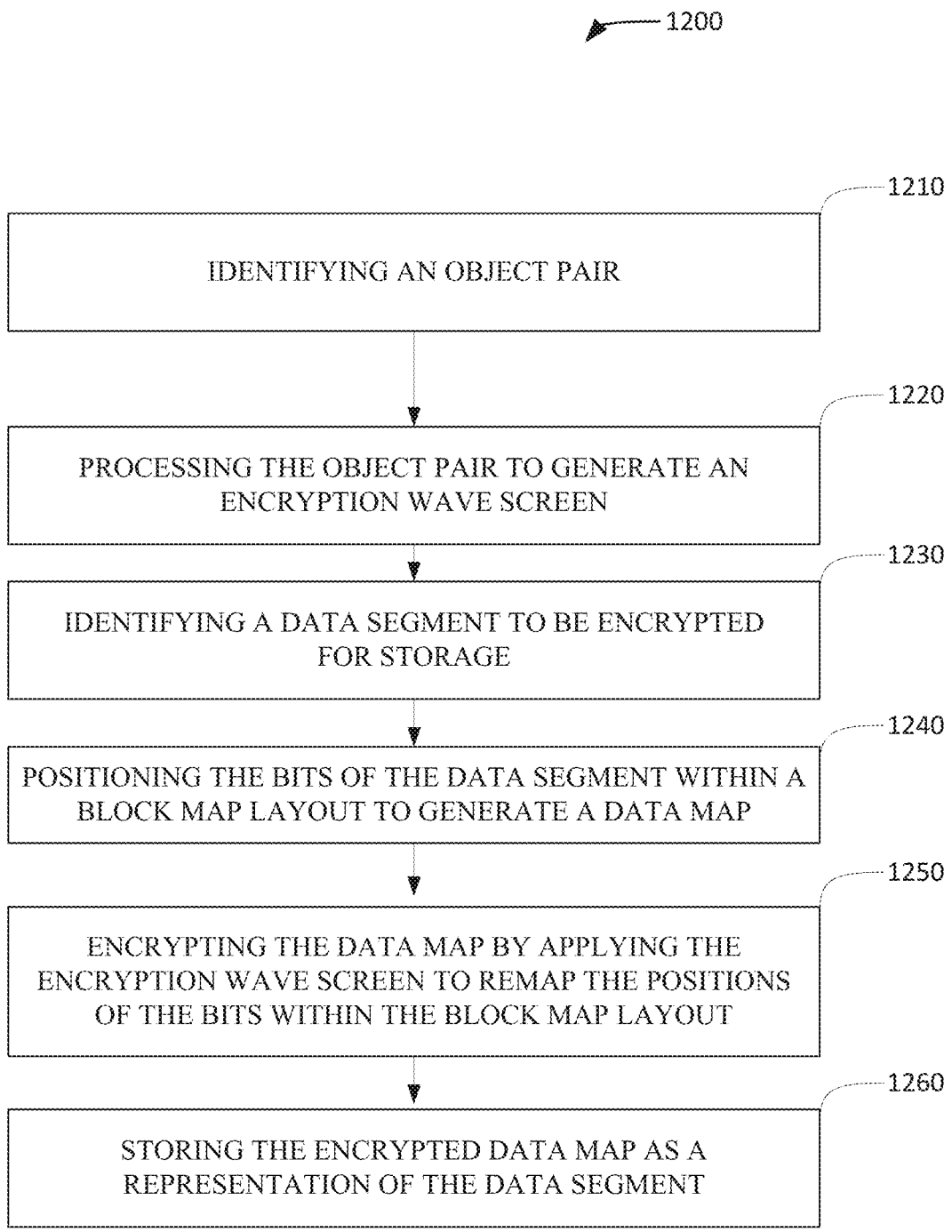
FIG. 12 is a flowchart of an exemplary data encryption method performed by the computing device of FIG. 11.

FIG. 12 is a flowchart 1200 of an exemplary data encryption method performed by computing device 1100 of FIG. 11. In step 1210, computing device 1100 identifies a first object and a second object. In an exemplary embodiment, the first object comprises a string of binary values having a string length x so as to provide 2x possible combinations of binary values for the first object, and the second object comprises a string of integers having a string length y so as to provide y-factorial possible combinations of integers for the second object. Each of the first and second objects may be associated with an identity of a computing device, a user identity, an organizational identity, a network identity, a biometric signature, a software application, a timestamp, a geographic location, or other attributes. Preferably, the first and second objects (or a single set of values from which the objects may be derived) are stored on a storage device separate from computing device 1100, such as a mobile phone, a removable storage device (e.g., a USB drive), or a smart card. As such, computing device 1100 identifies the first and second objects by retrieving the objects (or a single set of values from which the objects may be derived) from the storage device.

In step 1220, computing device 1100 processes the first and second objects to generate an encryption wave screen. The wave screen comprises a set of remapping instructions associated with a block map layout. In an exemplary embodiment, the set of remapping instructions identifies a correspondence between a plurality of initial bit positions and a plurality of remapped bit positions within the block map layout. The initial bit positions are transposed to the remapped bit positions based on an interaction between the binary values of the first object and the integers of the second object to generate a set of wave screen production instructions and optionally based further on a data mask defined by the binary values of the first object.

In step 1230, computing device 1100 identifies a data segment to be encrypted. In step 1240, computing device 1100 positions the bits of the data segment within the block map layout to generate a data map. In step 1250, computing device 1100 encrypts the data map by applying the wave screen to remap the positions of the bits within the block map layout in accordance with the set of remapping instructions. Optionally, the data map is further encrypted by applying one or more additional wave screens each of which is generated based on additional objects as described above and/or by applying one or more stumbling blocks each of which is generated based on a stumbling signature comprising a string of integers and/or by applying one or more XOR blocks each of which is generated based on an identified object. For example, the data map may be dually encrypted using a first wave screen associated with computing device 1100 and a second wave screen specific to an organization associated with computing device 1100. Additional wave screens may be associated with other attributes, such as an identify of user 1110, a biometric signature of user 1110, a software application used to create the underlying data to be stored, a timestamp associated with the storage of the encrypted data map, a geographic location of computing device 1100, or other attributes. Of course, it should be understood that steps 1230-1250 are repeated for each data segment of the data to be encrypted.

Finally, in step 1260, computing device 1100 stores each encrypted data map as a representation of the data segment in memory area 1130. If one or more stumbling blocks have been used to encrypt the data segments, the stumbling signature(s) may also be stored along with the encrypted data maps. Alternatively, computing device 1100 may transport the encrypted data maps to a remote server for storage. In this case, the encrypted data maps may optionally be further encrypted with a transport level wave screen (based on transport level objects) to provide another layer of encryption for the "in flight" data during transmission to the remote server. Further, if one or more stumbling blocks have been used to encrypt the data segments, the stumbling signature(s) may also be transported along with the encrypted data maps. Upon receipt of the encrypted data maps, the remote server may further encrypt the encrypted data maps with a remote server wave screen (based on remove server objects) to provide yet another layer of encryption for the stored data.

While FIG. 12 shows the steps of a data encryption method, it should be understood that the encrypted data maps may be decrypted by applying decryption wave screens, stumbling blocks and/or XOR blocks that reverse the steps shown in FIG. 12 in order to allow authorized users (i.e., users with the appropriate objects and/or stumbling signatures) to access the data segments.

Figure 13:
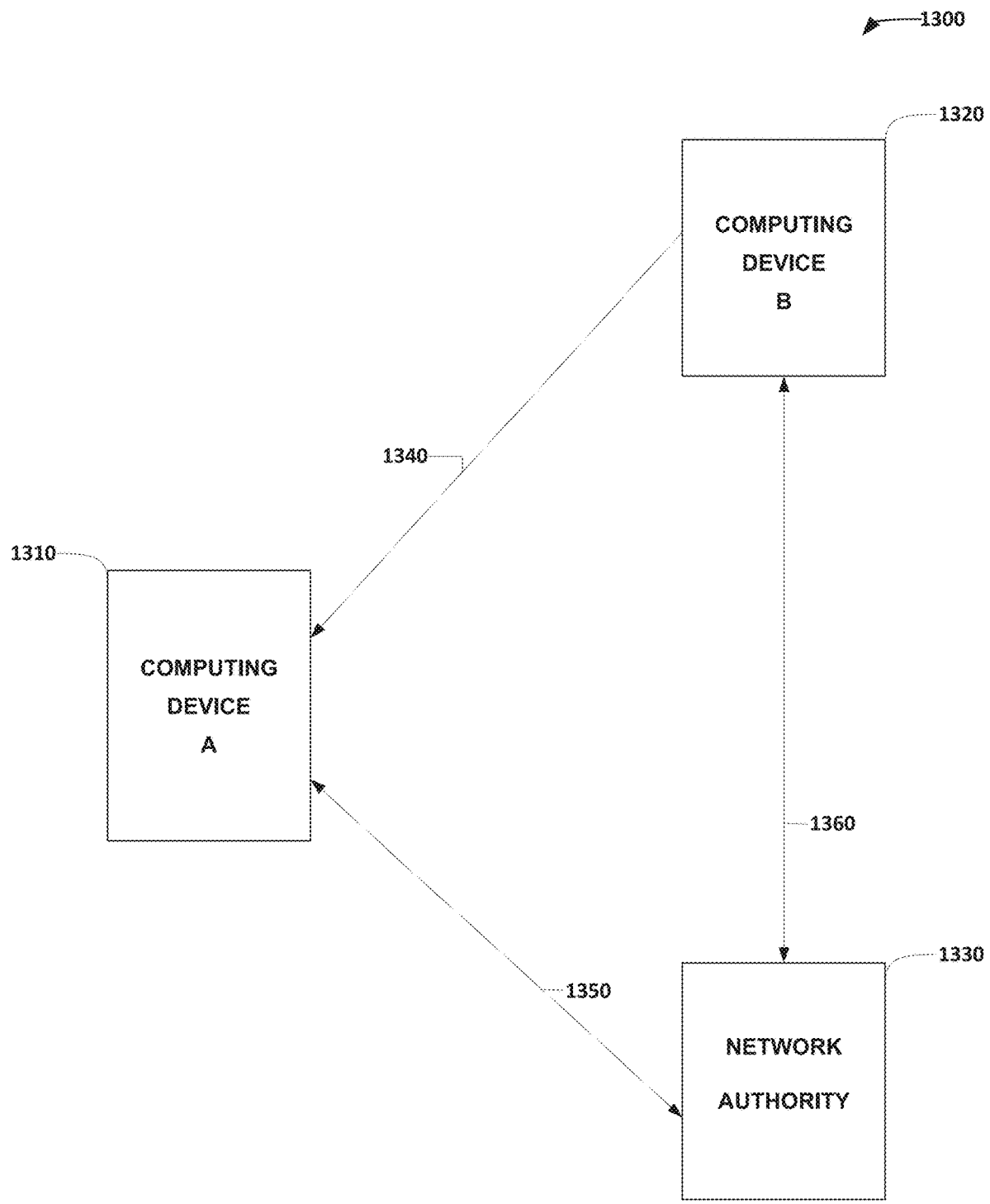
FIG. 13 is a block diagram of an exemplary system that enables the transport of encrypted data between first and second computing devices.

FIG. 13 is a block diagram of an exemplary system 1300 that enables the transport of encrypted data between a first computing device 1310 and a second computing device 1320 in accordance with the present invention. The configurations of first computing device 1310 and second computing device 1320 are the same as that of computing device 1100 shown in FIG. 11. In system 1300, a network authority 1330 is also provided to manage transport level encryption for data transmitted between first computing device 1310 and second computing device 1320, as described below.

As can be seen, first computing device 1310 is in communication with second communication device 1320 via a communication link 1340. Also, first computing device 1310 is in communication with network authority 1330 via a communication link 1350 and, similarly, second computing device 1320 is in communication with network authority 1330 via a communication link 1360. Communication links 1340, 1350 and 1360 represent any suitable wired or wireless communication links known in the art, including, but not limited to, those provided by the Internet or any other computer network.

An exemplary operation of system 1300 will now be described in which first computing device 1310 transmits encrypted data over communication link 1340 to second computing device 1320, and computing device 1320 receives and decrypts the data. In this example, the communication between first computing device 1310 and second computing device 1320 is referred to as a "session," wherein session specific objects for use in encrypting and decrypting the exchanged data are known by both first computing device 1310 and second computing device 1320. Session level encryption may be facilitated by ad hoc networking of session objects agreed upon by the computing devices, by usage of a trusted authority serving the computing devices, or by any other means known in the art.

Figure 14:
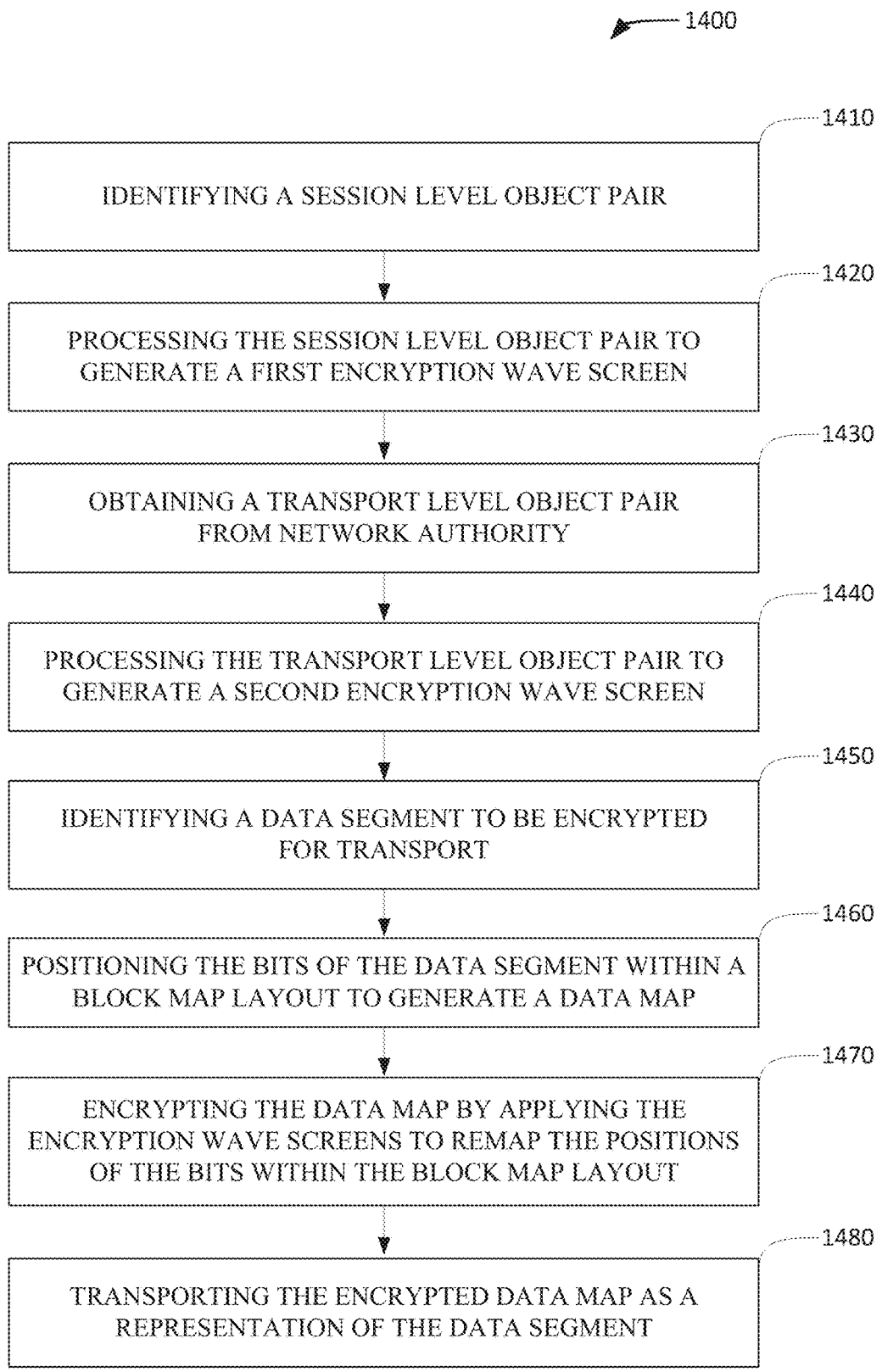
FIG. 14 is a flowchart of an exemplary data encryption method performed by the first computing device of FIG. 13.

FIG. 14 is a flowchart 1400 of an exemplary data encryption method performed by first computing device 1310 of FIG. 13. In step 1410, first computing device 1310 identifies a first object and a second object that are specific to the session between first computing device 1310 and second computing device 1320. As mentioned above, the session specific objects are previously-known by first computing device 1310. In step 1420, first computing device 1310 processes the session specific objects to generate a first encryption wave screen.

In step 1430, first computing device 1310 identifies a first object and a second object that are specific to the transport of data between first computing device 1310 and second computing device 1320. In this example, first computing device 1310 obtains the transport level objects from network authority 1330 over communication link 1350. In step 1440, first computing device 1310 processes the transport level objects to generate a second encryption wave screen.

In step 1450, first computing device 1310 identifies a data segment to be encrypted for transport to second computing device 1320. In step 1460, first computing device 1310 positions the bits of the data segment within a block map layout to generate a data map. In step 1470, first computing device 1310 encrypts the data map by applying the first and second encryption wave screens to remap the positions of the bits within the block map layout. In this example, the first encryption wave screen is applied prior to the second encryption wave screen, although the order could be reversed in other examples. Optionally, the data map is further encrypted by applying one or more additional wave screens each of which is generated based on additional objects as described above and/or by applying one or more stumbling blocks each of which is generated based on a stumbling signature comprising a string of integers and/or one or more XOR blocks each of which is generated based on an identified object. Of course, it should be understood that steps 1450-1470 are repeated for each data segment of the data to be encrypted.

Finally, in step 1480, first computing device 1310 transports each encrypted data map over communication link 1340 to second computing device 1320. Thus, at least two levels of encryption (session specific and transport level) are used to encrypt the "in flight" data and provide secure data transmission between two computing devices over a network. If one or more stumbling blocks have been used to encrypt the data segments, the stumbling signature(s) may also be transported along with the encrypted data maps.

Figure 15:
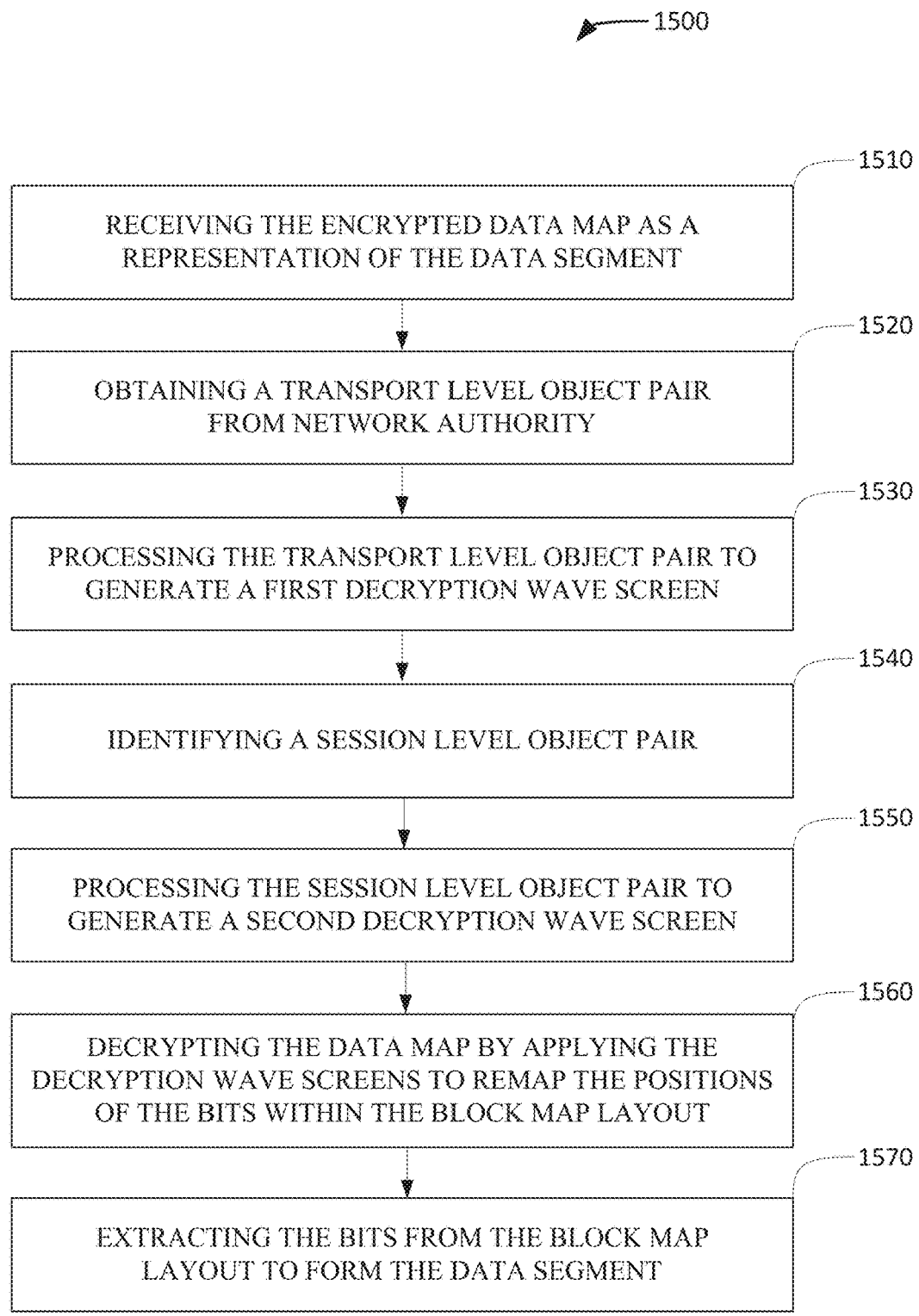
FIG. 15 is a flowchart of an exemplary data decryption method performed by the second computing device of FIG. 13.

FIG. 15 is a flowchart 1500 of an exemplary data decryption method performed by second computing device 1320 of FIG. 13. In step 1510, second computing device 1320 receives each encrypted data map that was transmitted by first computing device 1310, as described above (and optionally the stumbling signature(s) if one or more stumbling blocks have been used for encryption).

In step 1520, second computing device 1320 identifies a first object and a second object that are specific to the transport of data between first computing device 1310 and second computing device 1320. In this example, second computing device 1320 obtains the transport level objects from network authority 1330 over communication link 1360. In step 1530, second computing device 1320 processes the transport level objects to generate a first decryption wave screen.

In step 1540, second computing device 1320 identifies a first object and a second object that are specific to the session between first computing device 1310 and second computing device 1320. As mentioned above, the session specific objects are previously-known by second computing device 1320. In step 1550, second computing device 1320 processes the session specific objects to generate a second decryption wave screen.

In step 1560, second computing device 1320 decrypts the data map by applying the first and second decryption wave screens to remap the positions of the bits within the block map layout. In this example, the first decryption wave screen is applied prior to the second decryption wave screen, although the order could be reversed in other examples. Optionally, the data map is further decrypted if any additional wave screens and/or stumbling blocks and/or XOR blocks were applied by first computing device 1310 during the encryption process described above. Finally, in step 1570, second computing device 1320 extracts the bits from the block map layout of the decrypted data map to form the original data segment. Of course, it should be understood that steps 1560-1570 are repeated for each data segment of the data to be decrypted.

One skilled in the art will appreciate that the data encryption and decryption methods described above in connections with FIGS. 12, 14 and 15 may be implemented using any computer programming or engineering techniques including computer software, firmware, hardware or any combination or subset thereof. Any computer program, having computer-readable code means, may be embodied or provided within one or more computer-readable media, thereby making a computer program product, i.e., an article of manufacture. Computer-readable storage media are tangible and non-transitory and store information such as computer-readable instructions, data structures, program modules, and other data.

6. General

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. No language in the description should be construed as indicating any non-claimed element essential to the practice of the invention.

The use of relative relational terms, such as first and second, top and bottom, and left and right, are used solely to distinguish one unit or action from another unit or action without necessarily requiring or implying any actual such relationship or order between such units or actions. For example, while the block map layouts referenced herein require a certain spatial relationship between bit positions of the mapped layouts, any equivalent structures may be used. Also, as described herein, the plurality of objects do not require any particular format, size, or definition other than to allow for the creation of the wave screens as described herein.

The use of the terms "comprises," "comprising," or any other variation thereof, are intended to cover a non-exclusive inclusion, such that a process, method, device, or system that comprises a list of elements does not include only those elements, but may include other elements not expressly listed or inherent to such process, method, device, or system.

While the present invention has been described and illustrated hereinabove with reference to several exemplary embodiments, it should be understood that various modifications could be made to these embodiments without departing from the scope of the invention. Therefore, the present invention is not to be limited to the specific configurations or methodologies of the exemplary embodiments, except insofar as such limitations are included in the following claims.

What is claimed and desired to be secured by Letters Patent is as follows:

1. A computing device for encrypting data, comprising:
   a processor configured to encrypt a data segment comprising a plurality of bits by:
      positioning the bits within a block map layout to generate a data map;
      encrypting the data map by (a) applying at least one XOR block comprising a set of bits positioned within the block map layout and (b) applying a wave screen comprising a set of remapping instructions that identifies a correspondence between a plurality of initial bit positions and a plurality of remapped bit positions within the block map layout; and
   one or both of (a) a memory device configured to store the encrypted data map as a representation of the data segment and (b) a communications interface configured to transport the encrypted data map as a representation of the data segment.

2. The computing device of claim 1, wherein the wave screen is generated based on a first object and a second object, wherein the first object comprises a string of binary values and the second object comprises a string of integers.

3. The computing device of claim 2, wherein the first and second objects are specific to a session.

4. The computing device of claim 2, wherein the processor is configured to generate the wave screen based on a set of wave screen production instructions in which the binary values of the first object are paired with the integers of the second object to create a set of binary value/integer pairs, wherein the binary value of each of the binary value/integer pairs indicates a direction of data movement within the block map layout and the integer of each of the binary value/integer pairs indicates an offset of data movement within the block map layout.

5. The computing device of claim 4, wherein the processor is further configured to generate the wave screen based on a data mask.

6. The computing device of claim 1, wherein the XOR block is generated based on an object comprising a string of binary values.

7. The computing device of claim 1, wherein the processor is configured to apply the XOR block prior to the wave screen.

8. The computing device of claim 1, wherein the processor is configured to apply the wave screen prior to the XOR block.

9. A method of encrypting data for secure storage or transport, comprising:
- generating a wave screen comprising a set of remapping instructions that identifies a correspondence between a plurality of initial bit positions and a plurality of remapped bit positions within a block map layout;
- generating at least one exclusive or (XOR) block comprising a set of bits positioned within the block map layout;
- encrypting a data segment comprising a plurality of bits by (a) positioning the bits within the block map layout to generate a data map and (b) encrypting the data map by (i) applying the XOR block and (ii) applying the wave screen; and
- storing or transporting the encrypted data map as a representation of the data segment.

10. The method of claim 9, wherein the wave screen is generated based on a first object and a second object, wherein the first object comprises a string of binary values and the second object comprises a string of integers.

11. The method of claim 10, wherein the first and second objects are specific to a session.

12. The method of claim 10, wherein the wave screen is generated based on a set of wave screen production instructions in which the binary values of the first object are paired with the integers of the second object to create a set of binary value/integer pairs, wherein the binary value of each of the binary value/integer pairs indicates a direction of data movement within the block map layout and the integer of each of the binary value/integer pairs indicates an offset of data movement within the block map layout.

13. The method of claim 12, wherein the wave screen is further generated based on a data mask.

14. The method of claim 9, wherein the XOR block is generated based on an object comprising a string of binary values.

15. The method of claim 9, wherein the XOR block is applied prior to the wave screen.

16. The method of claim 9, wherein the wave screen is applied prior to the XOR block.

17. A computing device for encrypting data, comprising:
- a processor configured to encrypt a data segment comprising a plurality of bits by:
  - positioning the bits within a block map layout to generate a data map;
  - encrypting the data map by (a) applying at least one logic block comprising a set of bits positioned within the block map layout, wherein the logic block performs bit modification in accordance with a logical operation in which a first input bit and a second input bit determines an output bit and (b) applying a wave screen comprising a set of remapping instructions that identifies a correspondence between a plurality of initial bit positions and a plurality of remapped bit positions within the block map layout; and
- one or both of (a) a memory device configured to store the encrypted data map as a representation of the data segment and (b) a communications interface configured to transport the encrypted data map as a representation of the data segment.

18. The computing device of claim 17, wherein the wave screen is generated based on a first object and a second object, wherein the first object comprises a string of binary values and the second object comprises a string of integers.

19. The computing device of claim 18, wherein the first and second objects are specific to a session.

20. The computing device of claim 18, wherein the processor is configured to generate the wave screen based on a set of wave screen production instructions in which the binary values of the first object are paired with the integers of the second object to create a set of binary value/integer pairs, wherein the binary value of each of the binary value/integer pairs indicates a direction of data movement within the block map layout and the integer of each of the binary value/integer pairs indicates an offset of data movement within the block map layout.

21. The computing device of claim 20, wherein the processor is further configured to generate the wave screen based on a data mask.

22. The computing device of claim 17, wherein the logic block is generated based on an object comprising a string of binary values.

23. The computing device of claim 17, wherein the processor is configured to apply the logic block prior to the wave screen.

24. The computing device of claim 17, wherein the processor is configured to apply the wave screen prior to the logic block.

25. A method of encrypting data for secure storage or transport, comprising:
- generating a wave screen comprising a set of remapping instructions that identifies a correspondence between a plurality of initial bit positions and a plurality of remapped bit positions within a block map layout;
- generating at least one logic block comprising a set of bits positioned within the block map layout, wherein the logic block performs bit modification in accordance with a logical operation in which a first input bit and a second input bit determines an output bit;
- encrypting a data segment comprising a plurality of bits by (a) positioning the bits within the block map layout to generate a data map and (b) encrypting the data map by (i) applying the logic block and (ii) applying the wave screen; and
- storing or transporting the encrypted data map as a representation of the data segment.

26. The method of claim 25, wherein the wave screen is generated based on a first object and a second object, wherein the first object comprises a string of binary values and the second object comprises a string of integers.

27. The method of claim 26, wherein the first and second objects are specific to a session.

28. The method of claim 26, wherein the wave screen is generated based on a set of wave screen production instructions in which the binary values of the first object are paired with the integers of the second object to create a set of binary value/integer pairs, wherein the binary value of each of the binary value/integer pairs indicates a direction of data movement within the block map layout and the integer of each of the binary value/integer pairs indicates an offset of data movement within the block map layout.

29. The method of claim 28, wherein the wave screen is further generated based on a data mask.

30. The method of claim 25, wherein the logic block is generated based on an object comprising a string of binary values.

31. The method of claim 25, wherein the logic block is applied prior to the wave screen.

32. The method of claim 25, wherein the wave screen is applied prior to the logic block.

* * * * *